US012694307B2

(12) United States Patent
Mueller et al.

(10) Patent No.: US 12,694,307 B2
(45) Date of Patent: Jul. 28, 2026

(54) SYSTEMS AND METHODS FOR CLASSIFYING A WEBPAGE OR A WEBPAGE ELEMENT

(71) Applicant: Capital One Services, LLC, McLean, VA (US)

(72) Inventors: Erik Mueller, Chevy Chase, MD (US); Zenobia Liendo, Reston, VA (US); Jonathan Blocksom, Reston, VA (US); Eric Medin, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 1276 days.

(21) Appl. No.: 17/538,344

(22) Filed: Nov. 30, 2021

(65) Prior Publication Data

US 2023/0169364 A1 Jun. 1, 2023

(51) Int. Cl.
| | |
|---|---|
| *G06N 5/04* | (2023.01) |
| *G06F 16/906* | (2019.01) |
| *G06F 16/958* | (2019.01) |

(52) U.S. Cl.
CPC .............. *G06N 5/04* (2013.01); *G06F 16/906* (2019.01); *G06F 16/986* (2019.01)

(58) Field of Classification Search
CPC ....... G06N 5/04; G06F 16/906; G06F 16/986; G06Q 20/12
USPC ......................................................... 707/737
See application file for complete search history.

(56) References Cited

U.S. PATENT DOCUMENTS

| | | | |
|---|---|---|---|
| 7,660,779 | B2 | 2/2010 | Goodman et al. |
| 9,922,327 | B2 | 3/2018 | Johnson et al. |
| 10,140,374 | B2 | 11/2018 | Osann, Jr. |
| 10,235,681 | B2 | 3/2019 | Chang et al. |
| 10,505,973 | B2 | 12/2019 | Kupreev et al. |
| 10,956,837 | B1 * | 3/2021 | Benkreira .............. G06N 3/084 |
| 11,991,210 | B2 * | 5/2024 | Karin .................... G06N 20/00 |
| 2019/0294642 | A1 * | 9/2019 | Matlick ................ G06F 16/958 |
| 2020/0210511 | A1 | 7/2020 | Korobov et al. |
| 2020/0380498 | A1 | 12/2020 | Benkreira et al. |

(Continued)

OTHER PUBLICATIONS

MobileBERT QNA (web application) "Context (you can paste your own content in the text area", https://storage.googleapis.com/tfjs-models/demos/mobilebert-qna/index.html (1 page).

(Continued)

*Primary Examiner* — Tony Mahmoudi
(74) *Attorney, Agent, or Firm* — Bookoff McAndrews, PLLC

(57) ABSTRACT

Disclosed are methods and systems for classifying a webpage or one or more webpage elements. For instance, a method include detecting, by a user device, that a user of the user device has navigated to the webpage using a web browser installed on the user device and classifying, by the user device, the webpage or the one or more webpage elements into a classification by inputting first input data into one or more machine learning models. The method may further include, in response to classifying the webpage or the one or more webpage elements into the classification, causing the user device to display a user interface associated with an electronic application. The user interface may include information identifying the classification of the webpage.

19 Claims, 13 Drawing Sheets

(56) References Cited

U.S. PATENT DOCUMENTS

| | | | | |
|---|---|---|---|---|
| 2021/0311728 A1 | 10/2021 | Raiskin | | |
| 2021/0406337 A1* | 12/2021 | Frikha | | G06F 18/214 |
| 2022/0035943 A1* | 2/2022 | Jones | | G06F 16/2457 |
| 2022/0094736 A1 | 3/2022 | Duncan et al. | | |
| 2023/0018387 A1* | 1/2023 | Kuksta | | G06F 16/954 |
| 2023/0040412 A1* | 2/2023 | Ramsl | | G06F 8/73 |

OTHER PUBLICATIONS

Zhiqing Sun et al. "MobileBERT: a Compact Task-Agnostic BERT for Resource-Limited Devices" Carnegie Mellon University, Apr. 14, 2020 (13 pages).

Khanh LeViet "What's new in TensorFlow Lite from DevSummit 2020", https://blog.tensorflow.org/2020/04/whats-new-in-tensorflow-lite-from-devsummit-2020.html, Apr. 20, 2020, (16 pages).

Andrew Ng "Machine Learning Yearning: Technical Strategy for AI Engineers, In the Era of Deep Learning" 2018 Machine Learning Yearning—Draft, (pp. 118).

"TensorFlow.js is a library for machine learning in JavaScript" Develop ML models in JavaScript, and use ML directly in the browser or in Node.js. https://www.tensorflow.org/js, printed Sep. 16, 2021 (9 pages).

Models "Explore pre-trained TensorFlow.js models that can be used in any project out of the box", https://www.tensorflow.org/js/models, printed Sep. 16, 2021 (5 pages).

Dave Ridham "Industiral Classification of Websites by Machine Learning with hands-on Python", https://towardsdatascience.com/industrial-classification-of-websites-by-machine-learning-with-hands-on-python-3761b1b530f1, Jul. 30, 2018 (17 pages).

X. Qi et al. "Web Page Classification: Features and Algorithms" Lehigh Univeristy dated Feb. 2009, (31 pages).

"Work with automatic field detection", https://helpx.adobe.com/sign/using/automatic-field-detection.html, Adobe dated May 27, 2019, (8 pages).

Ido Green "Help users checkout faster with Autofill", https://developers.google.com/web/updates/2015/06/checkout-faster-with-autofill, dated Sep. 3, 2019, (6 pages).

Sheng J. et al. "DOM-Q-NET: Grounded RL on Structured Language" International Conference on Learning Representations (2019), https://github.com/Sheng-J/DOM-Q-NET, (4 pages).

Evan Zheran Liu et al. "Workflow-Guided Exploration: sample-efficient RL agent for web tasks", https://github.com/stanfordnlp/wge, dated Feb. 20, 2018, (6 pages).

"MiniWoB++ Benchmark", https://stanfordnlp.github.io/miniwob-plusplus/, dated Feb. 27, 2019, (5 pages).

Tianlin Shi et al. "World of Bits: An Open-Domain Platform for Web-Based Agents", Dated Aug. 6, 2017, (10 pages).

Howard J. Seltman "Chapter 4 of Experimental Design and Analysis" dated Jul. 11, 2018, (40 pages).

"Data Issues in Machine Learning", https://www.capitalone.com/tech/machine-learning/10-common-machine-learning-mistakes/, 2021, Capital One (22 pages).

Izzeddin Gur et al. "Learning to Navigate the Web" Dec. 21, 2018, published as a conference paper at ICLR 2019, (12 pages.).

Evan Zheran Liu et al. "Reinforcement Learning on Web Interfaces using Workflow-Guided Exploration", Feb. 24, 2018, published as a conference paper at ICLR 2018, (15 pages).

Sheng Jia et al. "DOM-Q-NET: Grounded RL on Structured Language", Feb. 19, 2019, published as a conference paper at ICLR 2019, (17 pages).

"Improving Virtual Card Numbers with Edge Machine Learning", https://www.capitalone.com/tech/machine-learning/edge-machine-learning-eno-virtual-card-numbers/, Capital One, dated Aug. 26, 2021, (7 pages).

Nicolai Pogrebnyakov "[DOM-Q-NET] Grounded RL on Structured Language / AISC Auther Speaking" Streamed live on Apr. 1, 2019, recording available at https://www.youtube.com/watch?v=T6-7ASpoUp4, (37 pages).

"Google Keynote (Google I/O'19)" streamed live on May 7, 2019, recording available at https://www.youtube.com/watch?v=lyRPyRKHO8M, (42 pages).

"Open Minded", https://www.openmined.org/, printed Nov. 30, 2021 (6 pages).

"Tfjs-models/qna/", GitHub, https://github.com/tensorflow/tfjs-models/tree/master/qna, last updated May 25, 2021, printed Sep. 16, 2021 (5 pages).

"Google-research/mobilebert" GitHub, https://github.com/google-research/google-research/tree/master/mobilebert, last updated Apr. 19, 2021, printed Sep. 16, 2021 (5 pages).

Mahdi Hashemi, "Web page classification: a survey of perspectives, gaps, and future directions", Multimedia Tools and Applications, Jan. 10, 2020, pp. 11921-11945, vol. 79, Issue 17-18, https://doi.org/10.1007/s11042-019-08373-8.

* cited by examiner

200

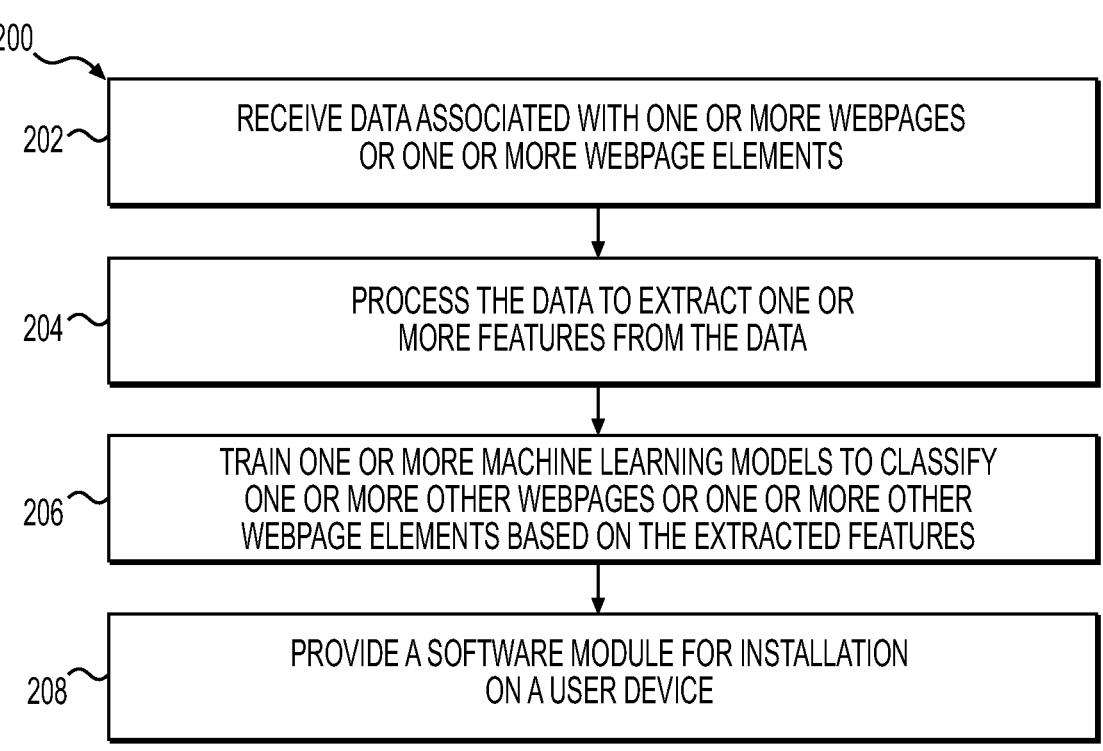

202 — RECEIVE DATA ASSOCIATED WITH ONE OR MORE WEBPAGES OR ONE OR MORE WEBPAGE ELEMENTS

204 — PROCESS THE DATA TO EXTRACT ONE OR MORE FEATURES FROM THE DATA

206 — TRAIN ONE OR MORE MACHINE LEARNING MODELS TO CLASSIFY ONE OR MORE OTHER WEBPAGES OR ONE OR MORE OTHER WEBPAGE ELEMENTS BASED ON THE EXTRACTED FEATURES

208 — PROVIDE A SOFTWARE MODULE FOR INSTALLATION ON A USER DEVICE

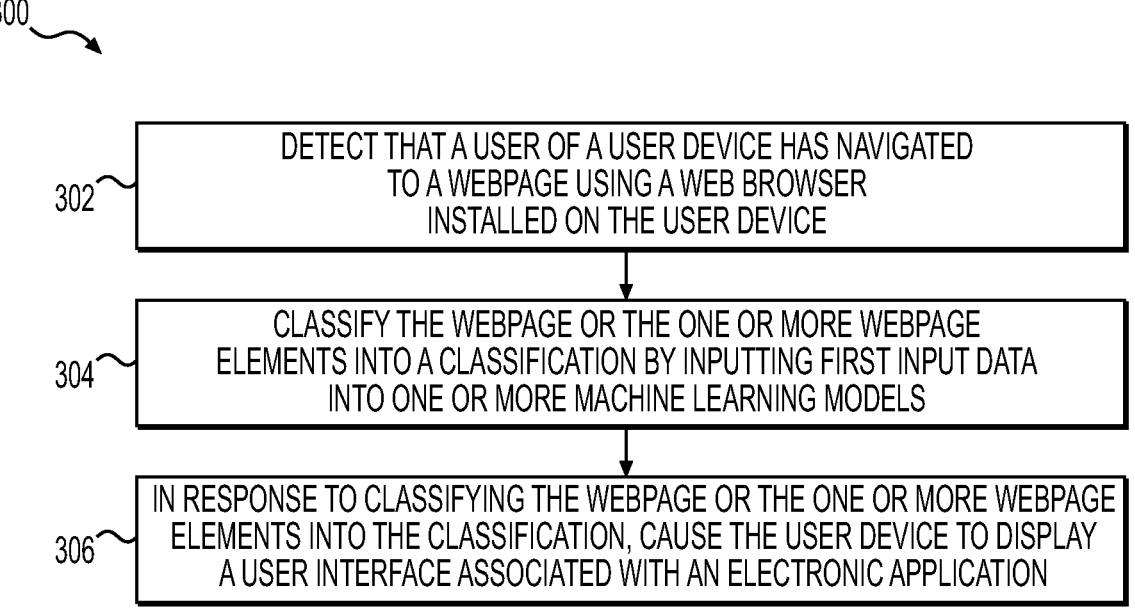

302 — DETECT THAT A USER OF A USER DEVICE HAS NAVIGATED TO A WEBPAGE USING A WEB BROWSER INSTALLED ON THE USER DEVICE

304 — CLASSIFY THE WEBPAGE OR THE ONE OR MORE WEBPAGE ELEMENTS INTO A CLASSIFICATION BY INPUTTING FIRST INPUT DATA INTO ONE OR MORE MACHINE LEARNING MODELS

306 — IN RESPONSE TO CLASSIFYING THE WEBPAGE OR THE ONE OR MORE WEBPAGE ELEMENTS INTO THE CLASSIFICATION, CAUSE THE USER DEVICE TO DISPLAY A USER INTERFACE ASSOCIATED WITH AN ELECTRONIC APPLICATION

① PICKUP DETAILS
ABC, CORP.
123 MAIN STREET

② PAYMENT
CARD NUMBER

EXP. DATE

CVV

BILLING ADDRESS

. . .

USER DEVICE 102

SYSTEMS AND METHODS FOR CLASSIFYING A WEBPAGE OR A WEBPAGE ELEMENT

TECHNICAL FIELD

Various embodiments of this disclosure relate generally to machine-learning-based techniques for classifying a webpage or a webpage element, and, more particularly, to systems and methods for populating certain webpage elements with data based on the classification of the webpage or the webpage element.

BACKGROUND

Machine learning techniques have been developed that may be integrated into a user's web-browsing experience. In a conventional example, data may be uploaded to a server device, a backend, a cloud system, or the like from a user's user device (e.g., a laptop computer, a mobile phone, etc.). The server device may then process the data using the machine learning models, and return results of the processing. In another similar conventional example, the server device may obtain the data directly without receiving the data from a user device. However, by utilizing machine learning models on remote servers, conventional techniques generally experience latency due to transmission of data and returning of processing results, may be difficult to customize on a per-user basis, and/or may be limited by the availability of a connection between the user device and the remote server devices. Further, remote and/or centralized processing may require the user to upload data that they otherwise might not wish to provide.

This disclosure is directed to addressing above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for classifying a webpage or a webpage element. The methods and systems may provide an ability to accurately classify a webpage or a webpage element using one or more machine learning models for population and/or selection of the webpage element.

For instance, a computer-implemented method for classifying a webpage or one or more webpage elements may include detecting, by a user device, that a user of the user device has navigated to the webpage using a web browser installed on the user device and classifying, by the user device, the webpage or the one or more webpage elements into a classification by inputting first input data into one or more machine learning models. The first input data may include at least: a document object model (DOM) of the webpage, text associated with the webpage or the one or more webpage elements, and a position of the one or more webpage elements as rendered on a display associated with the user device. The one or more machine learning models may have been trained based on one or more pre-classified webpages or webpage elements so as to learn associations between the one or more pre-classified webpages or webpage elements and one or more classifications, such that the one or more machine learning models are configured to perform the classifying based on the learned associations. The method may further include, in response to classifying the webpage or the one or more webpage elements into the classification, causing the user device to display a user interface associated with an electronic application. The user interface may include information identifying the classification of the webpage.

A computer-implemented method for training a machine-learning model for classifying one or more webpages or webpage elements may include receiving data associated with one or more webpages or one or more webpage elements. The one or more webpages or the one or more webpage elements may have a particular classification and the data may include document object models (DOMs) of the one or more webpages, text associated with the one or more webpages or the one or more webpage elements, and positions of the one or more webpage elements as rendered on a display associated with a user device. The method may further include processing the data to extract one or more features from the data, training one or more machine learning models to classify one or more other webpages or one or more other webpage elements based on the extracted features, and providing a software module for installation on the user device. The software module may include the one or more trained machine learning models and an electronic application configured to use the one or more machine learning models.

A system for classifying a webpage or one or more webpage elements may include a memory storing instructions and one or more machine learning models trained, based on webpages and associated webpage elements, to learn associations between the webpages and associated webpage elements and output classifications based on the learned associations in response to input webpage-related data. The system may further include a processor operatively connected to the memory and configured to execute the instructions to perform operations including receiving, by a user device, an indication to start monitoring web browsing activity of a user of the user device. The operations may further include detecting, by the user device, that the user has navigated to the webpage using a web browser installed on the user device and classifying, by the user device, the webpage or the one or more webpage elements into a classification by inputting first input data into the one or more machine learning models. The first input data may include at least: a document object model (DOM) of the webpage, text associated with the webpage or the one or more webpage elements, and a position of the one or more webpage elements as rendered on a display associated with the user device. The operations may further include, in response to classifying the webpage or the one or more webpage elements as a first classification, causing the user device to display a user interface associated with an electronic application. The user interface may further include information identifying the classification of the webpage, and one or more input controls associated with causing the electronic application to populate transaction-related data into at least one of the one or more webpage elements. The operations may further include, based on selection of the one or more input controls, populating, by the user device, the transaction-related data into the at least one of the one or more elements.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of an exemplary process for training a machine-learning model to learn associations between one or more webpages and/or one or more webpage elements and classifications of the one or more webpages and/or the one or more webpage elements, according to certain embodiments.

FIG. 3 depicts a flowchart of an exemplary process for classifying one or more webpages and/or one or more webpage elements, according to certain embodiments.

DETAILED DESCRIPTION OF EMBODIMENTS

Figure 1:
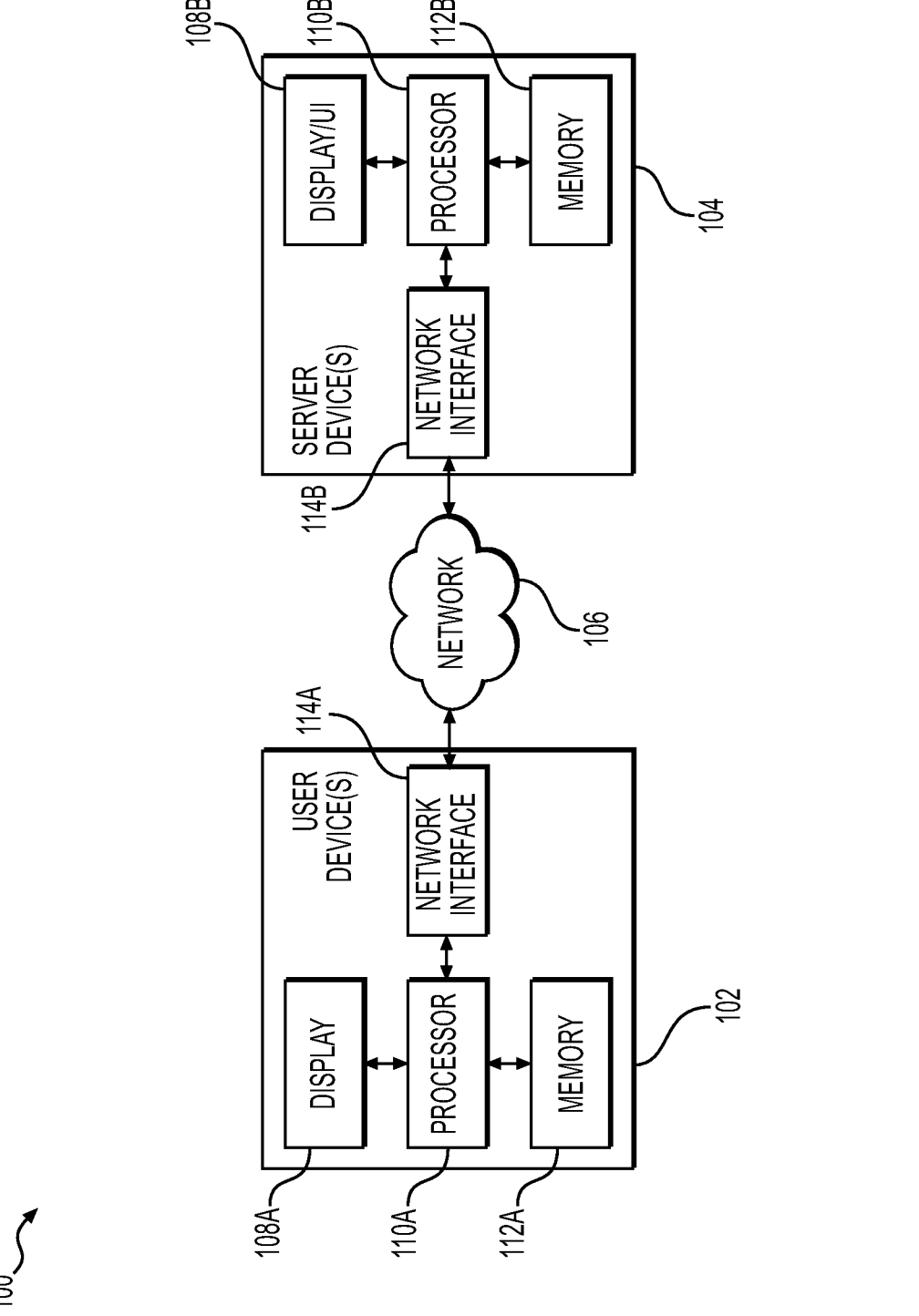
FIG. 1 depicts an exemplary environment for training and/or using one or more machine learning models to classify one or more webpages and/or one or more webpage elements, according to certain embodiments.

According to certain aspects of the disclosure, methods and systems are disclosed for classifying, at a user device, one or more webpages or one or more webpage elements, e.g., classifying a webpage as a customer checkout webpage or classifying certain input elements as input elements for transaction-card-related data and inputting the transaction-card-related data into the input elements based on the classification. Conventional techniques may utilize machine learning models to process a variety of types of data. However, conventional techniques may not be suitable. For example, conventional techniques may utilize machine learning models on remote servers and may generally experience latency due to transmission of data and return of processing results, may be difficult to customize on a per-user basis, and/or may be limited by the availability of a connection between the user device and the remote server devices. Accordingly, improvements in technology relating to machine learning processing are needed.

As will be discussed in more detail below, in various embodiments, systems and methods are described for using one or more machine learning models installed on a user device to classify one or more webpages and/or one or more webpage elements, and perform various actions based on the classification. By training a machine-learning model, e.g., via supervised or semi-supervised learning, to learn associations between webpage-related data and classification data, the trained machine-learning model may be usable to classify webpages or webpage elements, and to input data into the webpage elements based on the classification.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software.

As used herein, a "machine-learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, certain embodiments may use one or more trained machine learning to classify one or more webpages and/or one or more webpage elements. Certain embodiment may, based on the classification, populate at least some of the one or more webpage elements. In another exemplary use case, a machine-learning model may be trained to learn associations between a webpage and/or a webpage element and a classification.

While of the examples above involve classifying webpages and/or webpage elements, it should be understood that techniques according to this disclosure may be adapted to websites, electronic documents, electronic forms, and/or the like. It should also be understood that the examples above are illustrative only. The techniques and technologies of this disclosure may be adapted to any suitable activity.

Presented below are various aspects of machine learning techniques that may be adapted to classify webpages and/or webpage elements. As will be discussed in more detail below, machine learning techniques adapted to classifying webpages and/or webpage elements, may include one or more aspects according to this disclosure, e.g., a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 for training and/or using one or more machine learning models to classify one or more webpages and/or one or more webpage elements, according to certain embodiments, and which may be used with the techniques presented herein. The environment 100 may include one or more user devices 102, one or more server devices 104, and a network 106. Although FIG. 1 depicts a single user device 102, server device 104, and network 106, the embodiments described herein are applicable to environments 100 that include two or more user devices 102, server devices 104, and/or networks 106 in any suitable arrangement.

The user device 102 may include a display 108A, a processor 110A, a memory 112A, and/or a network interface 114A. The user device 102 may be a mobile device, such as a cell phone, a tablet, a laptop computer, etc., a desktop computer, and/or the like. The user device 102 may execute, by the processor 110A, one or more instructions stored in the memory 112A to, e.g., train and/or use one or more machine learning models to classify webpages and/or webpage elements, as described elsewhere herein. One or more components of the user device 102 may generate, or may cause to be generated, one or more graphic user interfaces (GUIs) based on instructions/information stored in the memory 112A, instructions/information received from the server device 104, and/or the like and may cause the GUIs to be displayed via the display 108A. The GUIs may be, e.g., mobile application interfaces or browser user interfaces and may include text, input text boxes, selection controls, and/or the like. The display 108A may include a touch screen or a display with other input systems (e.g., a mouse, keyboard, etc.) for an operator of the user device 102 to control the functions of the user device 102. The network interface 114A may be a transmission control protocol/Internet protocol (TCP/IP) network interface, or another type of wired or wireless communication interface, for Ethernet or wireless communications with the server device 104 via the network 106.

The server device 104 may include a display 108B, a processor 110B, a memory 112B, and/or a network interface 114B. The server device 104 may be a computer, system of computers (e.g., rack server(s)), or a cloud service computer system (e.g., in a data center). The server device 104 may execute, by the processor 110B, one or more instructions stored in the memory 112B to, e.g., train and/or use one or more machine learning models to classify webpages and/or webpage elements. One or more components of the server device 104 may generate, or may cause to be generated, one or more graphic user interfaces (GUIs) based on instructions/information stored in the memory 112B, instructions/information received from the user device 102, and/or the like and may cause the GUIs to be displayed via the display 108B.

The network 106 may include one or more wired and/or wireless networks, such as the Internet, an intranet, a wide area network ("WAN"), a local area network ("LAN"), personal area network ("PAN"), a cellular network (e.g., a 3G network, a 4G network, a 5G network, etc.) or the like. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "webpage" generally encompasses a location, data store, or the like that is, e.g., hosted and/or operated by a computer system so as to be accessible online, and that may include data configured to cause a program such as a web browser to perform operations such as send, receive, or process data, generate a visual display and/or an interactive interface, or the like. The user device 102 and the server device 104 may be connected via the network 106, using one or more standard communication protocols. The user device 102 and the server device 106 may transmit and receive messages from each other across the network 106, as discussed in more detail below.

As discussed in further detail below, the one or more components of exemplary environment 100 may generate, store, train and/or use a machine-learning model. The exemplary environment 100 or one of its components may include a machine-learning model and/or instructions associated with the machine-learning model, e.g., instructions for generating a machine-learning model, training the machine-learning model, using the machine-learning model, etc. The exemplary environment 100 or one of its components may include instructions for retrieving data, adjusting data, e.g., based on the output of the machine-learning model, and/or operating a display to output data, e.g., as adjusted based on the machine-learning model. The exemplary environment 100 or one of its components may include, provide, obtain, and/or generate training data.

In some embodiments, a system or device other than the components shown in the exemplary environment 100 may be used to generate and/or train the machine-learning model. For example, such a system may include instructions for generating and/or obtaining the machine-learning model, the training data and ground truth, and/or instructions for training the machine-learning model. A resulting trained-machine-learning model may then be provided to the exemplary environment 100 or one of its components and, for example, stored in the memory 110A and/or 110B.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Certain embodiments may utilize, for training a machine learning model, unsupervised learning where, e.g., the sample of training data may not include pre-assigned labels or scores to aid the learning process or may utilize semi-supervised learning where a combination of training data with pre-assigned labels or scores and training data without pre-assigned labels or scores is used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., may be used to compare the output of the trained model with the ground truth for that portion of the training data to evaluate an accuracy of the trained model. The training of the machine-learning model may be configured to cause the machine-learning model to learn associations between training data (e.g., secure user data) and ground truth data, such that the trained machine-learning model is configured to determine an output in response to the input data based on the learned associations.

In various embodiments, the variables of a machine-learning model may be interrelated in any suitable arrangement in order to generate the output. For example, in some embodiments, the machine-learning model may include an architecture that is configured classify webpages and/or webpage elements based on text of the webpage, text in relation to the webpage elements, a position of the webpage elements as displayed on the webpage, and/or the like. For example, the machine-learning model may include one or more neural networks configured to identify features in the data, and may include further architecture, e.g., a connected layer, neural network, etc., configured to determine a relationship between the identified features in order to determine a location in the data. In certain embodiments, the machine learning model may include a single node for classification, as described elsewhere herein.

Although depicted as separate components in FIG. 1, it should be understood that a component or portion of a component in the exemplary system 100 may, in some embodiments, be integrated with or incorporated into one or more other components. For example, a portion of the display 108A may be integrated into the user device 102 or the like. In another example, the server device 104 may be integrated in a data storage system. In some embodiments, operations or aspects of one or more of the components discussed above may be distributed amongst one or more other components. Any suitable arrangement and/or integration of the various systems and devices of the exemplary environment 100 may be used.

Further aspects of the machine-learning model and/or how it may be trained or used to classify webpages and/or webpage elements are discussed in further detail below. In the following disclosure, various acts may be described as performed or executed by a component from FIG. 1, such as the user device 102, the server device 104, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 depicts a flowchart of an exemplary process 200 for training a machine-learning model to learn associations between one or more webpages and/or one or more webpage elements and classifications of the one or more webpages and/or the one or more webpage elements, according to certain embodiments. At step 202, the process 200 may include receiving data associated with one or more webpages or one or more webpage elements. For example, a server device 104 may receive the data from another server device 104 (e.g., that hosts a website or that stores the data), via input from a user of the server device 104 (e.g., via a user device 102 configured as a user terminal for the server device 104), and/or the like.

The data may include document object models (DOMs) for the one or more webpages, text associated with the one or more webpages (e.g., text in a header, title, body, etc. of a webpage) or the one or more webpage elements (e.g., text in a label of an input box, text displayed on a selection control button, etc.), positions of the one or more webpage elements as rendered on a display (e.g., as determined from the DOM or as queried from the server device 104 given a display size and/or a resolution of the display), and/or the like. A DOM may include information related to a logical structure of a webpage that defines the way the webpage is accessed and/or rendered on a display. For example, a DOM may include various nodes of information arranged in a tree structure, where each node is related to an aspect of the webpage or its elements, such as the heading of the webpage, the title of the webpage, input boxes of the webpage, selection controls of the webpage, etc.

The data may further include classifications of the one or more webpages or the one or more webpage elements. For example, a classification may relate to the intended use of a webpage or a webpage element, information associated with the webpage or webpage element, and/or the like. As specific examples for a webpage, a classification may identify the webpage as a merchant webpage, a customer checkout webpage of a merchant website, and/or the like. As specific examples for a webpage element, a classification may identify the webpage element as an input text box or a button control, as an input text box for transaction-related data (e.g., transaction card-related data, a billing address, etc.), a selection button as controlling payment submission for a transaction, and/or the like.

In some embodiments, the data may include data from a live webpage (e.g., the server device 104 may download the data from a server device 104 that hosts the webpage). Additionally, or alternatively, the data may include data that is specifically designed to be training data. For example, a user may create training data that is not associated with, or is only partially associated with, a live webpage. This may help to train the machine learning models on a variety of data because live webpage data may have similar configurations due to use of templates for webpage design.

At step 204, the process 200 may include processing (or pre-processing), e.g., to prepare the data for use in training a machine learning model. Such pre-processing may include, for example, identifying and/or extracting one or more features from the data, e.g., that may be relevant to the training. For example, the server device 104 may process the data received at step 202 to extract one or more features from the data. In some embodiments, the pre-process may include a term frequency-inverse document frequency (tf-idf) analysis. For example, a td-idf analysis may be used to determine a numerical value for a term or phrase in the data based on a frequency of the term or phrase on a webpage. The numerical value may represent a relative importance or weight of the term or phrase relative to other terms or phrases associated with a webpage or a webpage element. For example, in the context of a transaction-related webpage, terms or phrases like "credit card" and "payment" may receive a higher numerical weighting than other terms or phrases like "terms and conditions" if "credit card" and "payment" are proximate to input text boxes and/or button controls of the webpage. Additionally, or alternatively, and as another example, the terms or phrases "credit card" and "payment" may receive a higher numerical rating if these terms occur more frequently on a webpage than other terms or phrases.

Additionally, or alternatively, the pre-process may include a logistic regression analysis. For example, the logistic regression analysis may utilize a logistic function or Sigmoid function that models the probability of a classification of a webpage or webpage element based characteristics of the webpage or webpage element, such as the term or phrase itself and the context of the analysis (e.g., some terms or phrases are more relevant to certain contexts), a position of the term or phrase in the DOM, and/or the like.

In some embodiments, the pre-processing of the data may include a featurization of the data associated with a webpage or a webpage element. The featurization may include, e.g., removing certain terms or phrases from the data that have been pre-identified as low weight terms or phrases (e.g., prepositions or articles), removing terms or phrases that appear less than a threshold number of times in certain portions of the webpage (e.g., in the title, header, or body of the webpage), removing text in certain portions of the webpage (e.g., a footer of the webpage), and/or the like. The featurization may help to improve the machine learning model training by removing pre-known low weight features of the data.

At step 206, the process 200 may include training one or more machine learning models to classify one or more other webpages or one or more other webpage elements based on at least a portion of the data, e.g., the extracted features from step 204. For example, the server device 104 may train the one or more machine learning models. In some embodiments, the training at step 206 may include inputting at least a portion of the data for the one or more webpages or the one or more webpage elements into the one or more machine learning models and inputting corresponding classifications for the one or more webpages and/or the one or more webpage elements. For example, data for a customer checkout webpage and information identifying the webpage as a customer checkout webpage may be input into the machine learning model so that the machine learning model can learn associations between the webpage data and the customer checkout webpage classification.

In some embodiments, the training at step 206 may include training separate models for classifying webpages and webpage elements. For example, the server device 104 may train one or more first machine learning models to classify webpages, such as based on text of the webpages, and may train one or more second machine learning models to classify webpage elements based on a DOM, text, and/or positions of the webpage elements as rendered on a display. In some embodiments, the output of one model may be used as an input into another model. For example, the classification of a webpage element by a first model may be used as an input in a second model for classifying a webpage including the webpage element. Any suitable arrangement or interrelation of models may be used.

In some embodiments, the process 200 may include, after the training at step 206, transforming the one or more trained machine learning models from a first programming language to a second programming language. For example, the server device 204 may have trained the one or more machine learning models at step 206 using a first programming language (e.g., Python™) and may transform the one or more machine learning models to a second programming language that is compatible with installation on a web browser or for end-user use (e.g., TensorFlow.js). The transformation may include reformatting program files or portions of program code for the machine learning models, adding or removing headers or footers to the program code, etc. Some of these operations may be performed automatically by a server device 104 or may be performed partially in an automatic manner and partially by a user of the user device 102.

At step 208, the process 200 may include providing a software module for installation on a user device. For example, the server device 104 may provide the software module to a web server device 104 to publish the software module for download and installation on a user device 102, may provide the software module to the user device 102 directly for installation (e.g., upon receiving a request from the user device 102), and/or the like. The software module may include one or more program files, electronic applications, and/or the like that can be installed on the user device 102 and executed by the user device 102. For example, the software module may include data for installation of a virtual assistant and the one or more machine learning models on a web browser of the user device 102. As described elsewhere herein, an electronic application installed on the user device 102 may use the one or more machine learning models to identify certain classifications of webpages and/or webpage elements.

Accordingly, certain embodiments may train one or more machine learning models to classify one or more webpages and/or one or more webpage elements. The process 200 described above is provided merely as an example, and may include additional, fewer, different, or differently arranged steps than depicted in FIG. 2.

FIG. 3 depicts a flowchart of an exemplary process 300 for classifying one or more webpages and/or one or more webpage elements, e.g., by utilizing a trained machine-learning model, according to certain embodiments. In some embodiments, the process 300 may be performed "client-side," e.g., on or by the user device 102 and/or by utilizing components of or local to the user device 102. At step 302, the process 300 may include detecting that a user of a user device has navigated to a webpage using a web browser installed on the user device. For example, the user device 102, via an electronic application installed on the user device 102, may detect that the user has navigated to the webpage that includes one or more webpage elements using the web browser. In some embodiments, the user device 102 may detect that the user has navigated to the webpage based on the user entering a uniform resource locator (URL) into the web browser to access the webpage, detecting that the web browser has loaded and displayed the webpage, and/or the like.

In some embodiments, prior to the detecting at step 302, the process 300 may include receiving an indication to monitor the web browsing activity of the user. For example, when the user opens a web browser on the user device 102, an electronic application installed on the web browser may prompt the user for affirmative input to allow the electronic application to monitor the web browsing activity of the user. Additionally, or alternatively, and as another example, the electronic application may receive the indication automatically when the user opens the web browser.

At step 304, the process 300 may include classifying the webpage or the one or more webpage elements into a classification by inputting first input data into one or more machine learning models. For example, the electronic application installed on the web browser of the user device 102 may classify the webpage or the one or more webpage elements. The one or more machine learning models may include the machine learning models trained in connection with the process 200 above. For example, the one or more machine learning models may have been trained based on one or more pre-classified webpages and/or webpage elements so as to learn associations between the one or more pre-classified webpages and/or webpage elements and one or more classifications, such that the one or more machine learning models are configured to perform the classifying based on the learned associations.

The first input data may include a DOM. For example, the electronic application installed on a web browser of the user device 102 may obtain the DOM for the webpage after the user has navigated to the webpage by querying a server device 104 hosting the webpage for the DOM, by processing program code of the webpage, and/or the like. Additionally, or alternatively, the first data may include text and/or content associated with the webpage or the one or more webpage elements. For example, the electronic application may obtain text of the webpage from the DOM, from program code of the website (e.g., by identifying certain hypertext markup language (HTML) tags in the program code), and/or the like. Additionally, or alternatively, the first input data may include a position of the one or more webpage elements as rendered on a display associated with the user device 102. For example, the electronic application may obtain a pixel position of a webpage element as rendered on a display from the DOM, using computer vision to process the displayed webpage, querying the server device 104 hosting the webpage, and/or the like.

In some embodiments, the classifying at step 304 may include classifying the webpage based on the text in a title or a header of the webpage or the text in labels associated with input elements or selection elements of the webpage. For example, the presence of certain terms or phrases in the text in a title or a header of the webpage may indicate a classification of the webpage. As a specific example in a transaction-related webpage context, the electronic application may classify the webpage as a customer checkout webpage or a payment webpage based on terms or phrases such as "checkout" or "enter payment information" being present in the title or the header of the webpage. Additionally, or alternatively, and as another example, the presence of certain terms or phrases less than a number of pixels from a webpage element may indicate a classification of the webpage. As a specific example in a transaction-related webpage context, the electronic application may classify an input text box as being configured to receive transaction card-related data based on the phrase "credit card number" being less than a certain number of pixels from the input text box.

In some embodiments, the classifying at step 304 may include classifying a webpage element based on one or more fields included in the DOM, one or more attributes for the one or more fields in the DOM, or a relationship between the text and the one or more webpage elements based on a pixel position of the text and a pixel position of the one or more webpage elements. For example, the presence of certain attributes for input text boxes and selection buttons on a webpage may indicate a classification of input text boxes and selection buttons. As a specific example in a transaction-related webpage context, the electronic application may classify a webpage element as a transaction card number input text box based on the webpage element being an input field in the DOM and having the attribute of receiving a 16-digit number. Additionally, or alternatively, the electronic application may classify the webpage element as the transaction card number input text box based on the text "transaction card number" being less than a certain number of pixels from the webpage element and based on the webpage element being an input field.

In some embodiments, the classifying at step 304 may include classifying a webpage or a webpage element based on one or more scores for the webpage or the webpage element. For example, the electronic application may determine a first score for the webpage and a second score for the webpage elements, where the first score and the second score indicate a fit of the webpage or the webpage elements to a classification. The electronic application may then classify the webpage or the webpage elements into the classification if the first score, the second score, or an aggregate score (e.g., an aggregate of the first score, the second score, and/or one or more other scores) satisfies a threshold. For example, the electronic application may determine an aggregate score of 0.9 for a webpage, indicating that there is a 90 percent likelihood that the webpage is a transaction-related webpage (e.g., a customer payment page), and the electronic application may classify the webpage as the transaction-related webpage based on the score being greater than a 0.8 threshold.

In some embodiments, the process 300 may include performing a featurization of the data associated with the webpage or the webpage elements prior to performing the classifying at step 304, in a manner similar to that described above in the context of the process 200. For example, the electronic application may process the data to remove certain terms or phrases, text from certain portions of the webpage, and/or the like.

At step 306, the process 300 may include, in response to classifying the webpage or the one or more webpage elements into the classification, causing the user device to display a user interface associated with an electronic application. For example, the electronic application may cause the user device to display the user interface in response to classifying the webpage or the one or more webpage elements into the classification. As a specific example in a transaction-related context, the electronic application may cause the user interface to be displayed based on classifying the webpage as a transaction-related webpage (e.g., a customer checkout page) or the webpage elements as transaction card-related elements (e.g., text boxes for input of transaction card-related data, button controls to submit payment via the webpage, etc.).

The user interface may include information identifying the classification of the webpage. For example, the user interface may include text, images, animated graphics and/or the like that indicate that the webpage or the webpage elements have been classified into the classification. Additionally, or alternatively, the user interface may include one or more controls (e.g., buttons, check boxes, radio buttons, etc.) for causing the electronic application to perform an action, and information describing the controls and/or requesting that the user make a selection of one or more of the controls. For example, and in a transaction context, the electronic application may be configured, upon appropriate selection of a control by the user, to input transaction card-related data into certain webpage elements and/or select a button control on the webpage to submit the transaction card-related data to a server device 104 for processing, and the information on the user interface may include one or more controls for causing or preventing the electronic application from performing those actions.

The process 300 may include, after the causing at step 306, gathering one or more metrics. For example, the electronic application may gather the one or more metrics. The one or more metrics may include whether the user selected, via the displayed user interface, to populate webpage elements with data, whether the user manually modified any of the data populated into the webpage elements, and/or the like. The process 300 may then include updating the one or more machine learning models based on the one or more metrics. For example, if the user selects to have the electronic application populate the webpage elements and the user does not make modifications to the populated data, then the electronic application may determine that the classification and population was accurately performed and may use data for the webpage and associated elements as training data for the machine learning models. In some embodiments, the electronic application may provide the metrics to a server device 104 that is separate from the user device 102 (e.g., so that the server device 102 can update the machine learning models based on the metrics).

Certain embodiments may limit the gathering of metrics related to successful classifications and/or populations (e.g., as determined by user selection to populate data into webpage elements and/or no modification of the data after population), such as in the scenario where the metrics are provided to the separate server device 104. This may conserve network resources by reducing or eliminating sending of metrics for every classification, may conserve computing resources of the user device 102 by reducing or eliminating a need for the user device 102 to gather metrics related to every classification, and/or may conserve computing resources of the server device 104 by reducing or eliminating a need for the server device 104 to update the machine learning models for every classification.

Accordingly, certain embodiments may use one or more machine learning models to classify one or more webpages and/or one or more webpage elements. The process 300 described above is provided merely as an example, and may include additional, fewer, different, or differently arranged steps than depicted in FIG. 3.

Figure 4A:
FIGS. 4A, 4B, and 4C depict an example 400 of classifying one or more webpages and/or one or more webpage elements, according to certain embodiments.
Figure 4B:
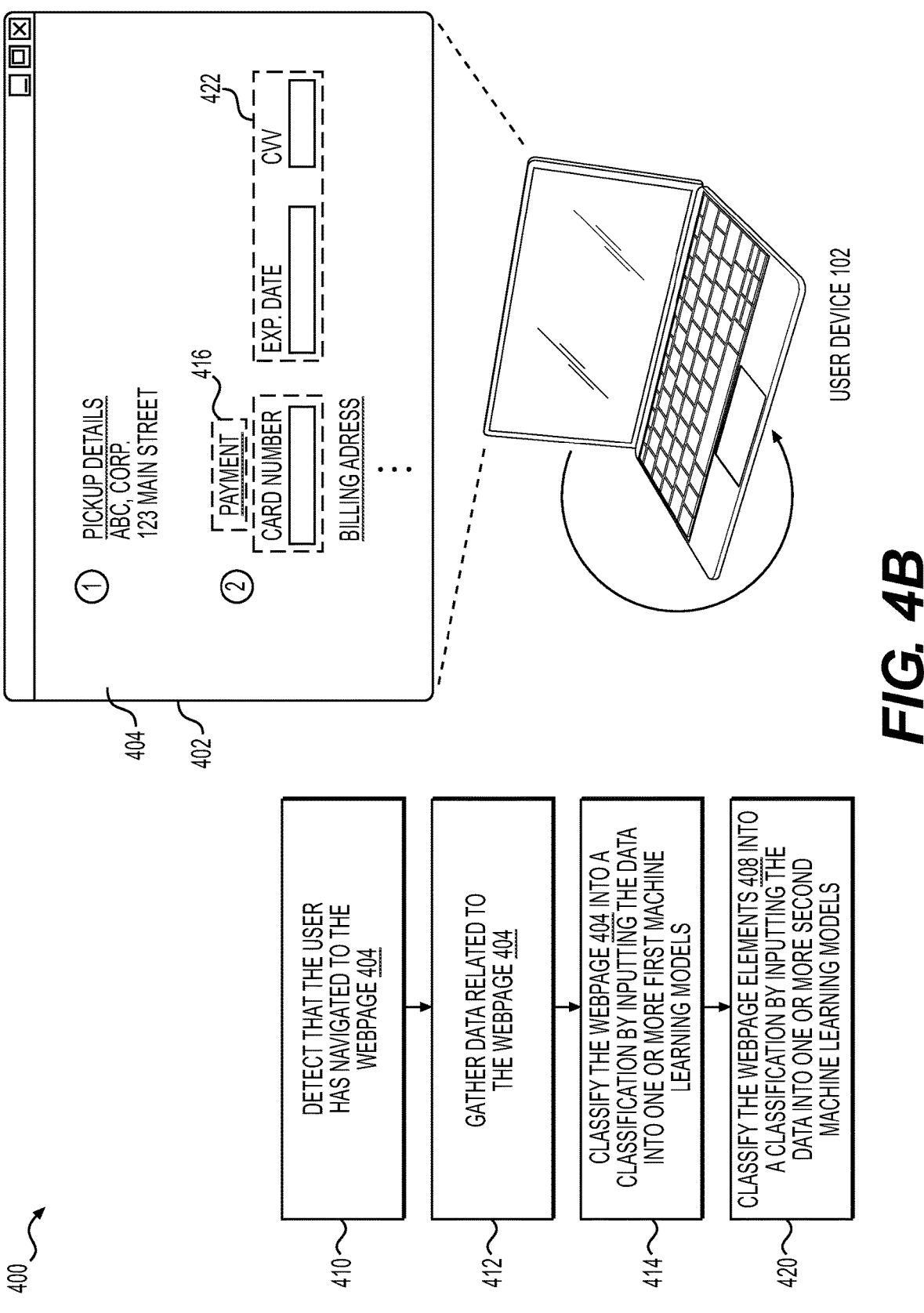
Figure 4C:
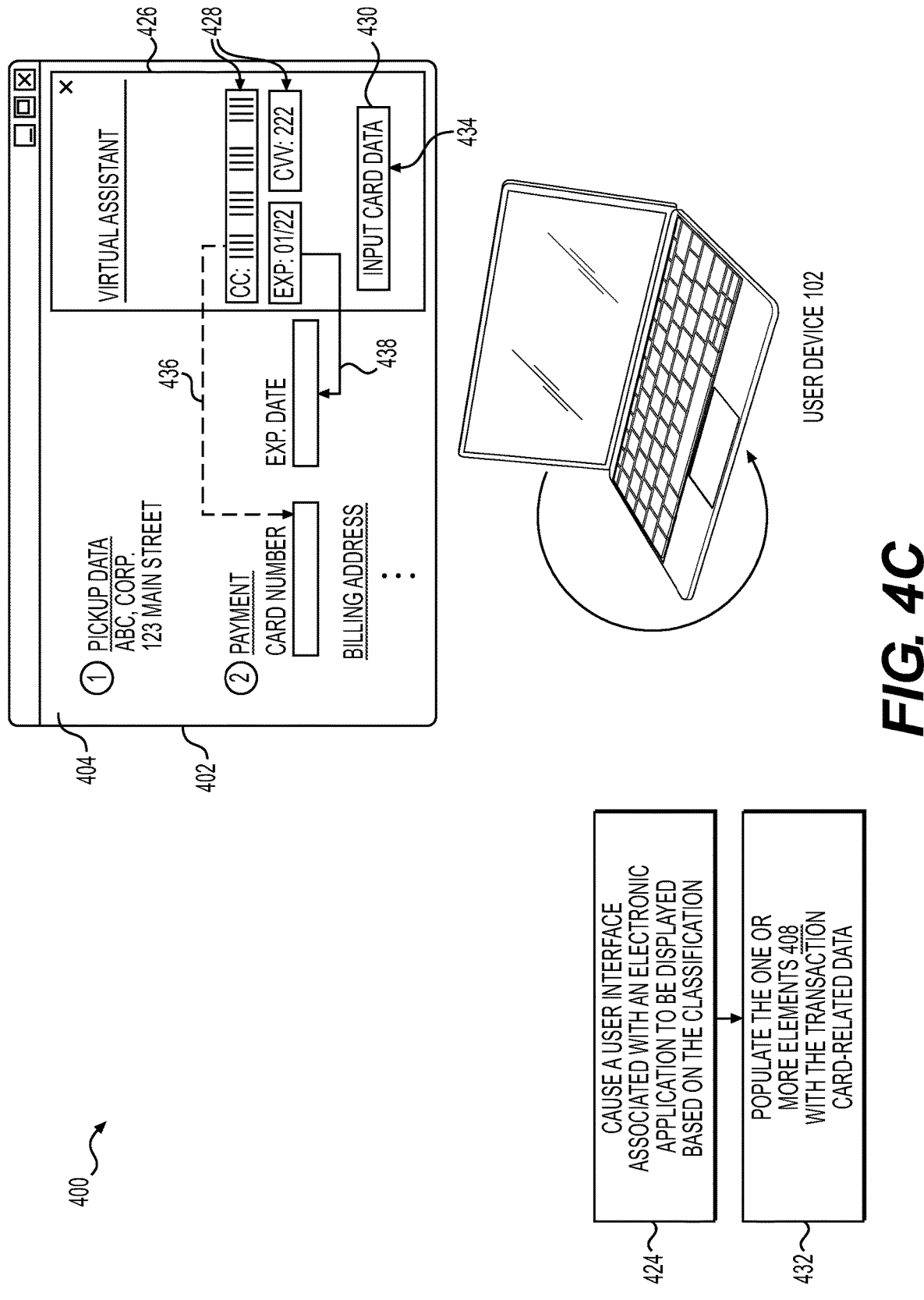

FIGS. 4A, 4B, and 4C depict an example 400 of classifying one or more webpages or one or more webpage elements, according to certain embodiments. As depicted in FIG. 4A, the example 400 includes a user device 102. A web browser 402 may be installed on the user device 102, which may be used to access a webpage 404. The webpage 404 may include text 406 (e.g., details related to picking up an ordered item, labels for input text boxes, etc.) and webpage elements 408 (e.g., input text boxes, selection buttons, etc.).

Turning to FIG. 4B, at 410, the user device 102 may, via the web browser 402, detect that the user has navigated to the webpage 404. For example, the user device 102 may perform this detection in a manner similar to that described above with respect to the step 302 of the process 300 depicted in FIG. 3. As a specific example, the web browser 402 may detect that the user has navigated to the webpage 404 based on the user inputting a URL into a navigation bar of the web browser 402 and causing the web browser 402 to access the webpage 404.

At 412, the user device 102, via the web browser 402, may gather data related to the webpage 404. For example, the web browser 402 may gather the data after the detecting at 410. The data may be similar to the first input data described above in connection with the step 304 of the process 300 depicted in FIG. 3. For example, the data may include a DOM for the webpage 404, the text 406 associated with the webpage 404 or the webpage elements 408 associated with the webpage 404, a position of the webpage elements 408 as rendered on a display (e.g., a display 108A) of the user device 102, and/or the like.

At 414, the user device 102, via the web browser 402, may classify the webpage 404 into a classification by inputting the data into one or more first machine learning models. For example, the web browser 402 may classify the webpage 404 in a manner similar to that described above in connection with the step 304 of the process 300 depicted in FIG. 3. As a specific example, and as illustrated at 416, the web browser 402 may classify the webpage 404 based on certain terms or phrases (e.g., "Payment") being present in the body of the webpage 404 or in a section header of the webpage 404. Continuing with the specific example, the one or more first machine learning models may apply a high importance weight to the term "Payment" because the term appears in a high importance portion of the webpage 404 (e.g., a section header). Additionally, or alternatively, and continuing with the specific example, the web browser 402 may classify the webpage 404 based on certain terms or phrases being within a threshold pixel distance of a webpage element 408. For example, the one or more first machine learning models may apply a high importance weight to the phrase "Card Number" when this phrase is less than a certain number of pixels from an input text box.

This processing at 414 may be performed for any suitable number, e.g., one, tens, hundreds, or thousands of terms, phrases, or other characteristics of the webpage 404, and the one or more first machine learning models may output a first score indicating a fit of the webpage 404 into the classification. Assume for the purposes of the example 400 that the web browser 402 classifies the webpage 404 as a payment webpage or a customer checkout webpage based on the first score.

At 420, the user device 102, via the web browser 402, may classify the webpage elements 408 into a classification by inputting the data into one or more second machine learning models. For example, the web browser 402 may classify the webpage elements 408 in a manner similar to that described above in connection with the step 304 of the process 300 depicted in FIG. 3. As a specific example, and as depicted at 422, the web browser 402 may classify the webpage elements 408 based on a displayed position of text relative to the webpage elements 408, based on a displayed position of the webpage elements 408 (or text-webpage element 408 pairs) relative to other webpage elements 110 (or text-webpage element 408 pairs). Continuing with the specific example, the one or more second machine learning models may apply a high importance weight to the terms "CVV" and/or "Exp. Date" and associated input text boxes because the text appears less than a number of pixels from the associated input text boxes and/or because the term-webpage element 408 pairs are less than a number of pixels from each other.

This processing at 420 may be performed for hundreds or thousands of terms, phrases, or other characteristics of the webpage elements 408 and the one or more second machine learning models may output a second score indicating a fit of the webpage elements 408 into the classification. Assume for the example 400 that the web browser 402 classifies the input text box under the text "Card Number" as an input text box for a transaction card number of a transaction card, the input text box under the text "Exp. Date" as an input text box for the expiration date of the transaction card, and the input text box under the text "CVV" as an input text box for a card verification value (CVV) for the transaction card. Although the operations at 414 have been described as being performed before the operations at 420, these operations may be performed in a different order or may be performed concurrently.

Turning to FIG. 4C, the user device 102, via the web browser 402, may, at 424, cause a user interface (e.g., user interface 426) associated with an electronic application to be displayed based on the classification of the webpage 402 or the webpage elements 408. For example, the web browser 402 may cause the user interface 426 to be displayed based on the webpage 404 being classified as a payment webpage or a customer checkout webpage or based on the webpage elements 408 being classified as input boxes for transaction card-related information. The user interface 426 may be associated with a virtual assistant, in some implementations. In addition, the user interface 426 may be installed on the web browser 402 as a plugin or an extension of the web browser 402.

As further depicted in FIG. 4C, the user interface 426 may include transaction card-related information 428 (e.g., a transaction card number, an expiration date, a CVV, etc. for a transaction card). In addition, the user interface 426 may include one or more selection controls 430 for controlling operation of the electronic application. In the example 400, the user interface 426 may include a selection control 430 to cause the electronic application to perform various actions related to the transaction card-related information, as described in more detail below.

At 432, the user device 102, via the web browser 402 (e.g., the electronic application on the web browser 402), may populate the one or more webpage elements 408 with the transaction card-related data depicted at 428. For example, and as depicted at 434, the electronic application may populate the webpage elements 408 with the transaction card-related data depicted at 428 based on selection of one or more selection controls 430. As depicted at 436, the electronic application may populate the input box for the transaction card number with the transaction card number for the transaction card. In addition, and as depicted at 438, the electronic application may populate the input box for the expiration date with the expiration date for the transaction card. The electronic application may populate one or more other webpage elements 408 with other information, such as the input box for the CVV with the CVV of the transaction card.

Accordingly, certain embodiments may use one or more machine learning models to classify one or more webpages and/or one or more webpage elements and to populate webpage elements with data based on the classification. As described above, the processing by the machine learning models may be performed on a user device, which may reduce latency, reduce network traffic, reduce removal of user-related data from the user device, etc. compared to conventional techniques that perform machine learning model processing on a server device that is remote from the user device. The example 400 described above is provided merely as an example, and may include additional, fewer, different, or differently arranged aspects than depicted in FIGS. 4A, 4B, and 4C.

Figure 5:
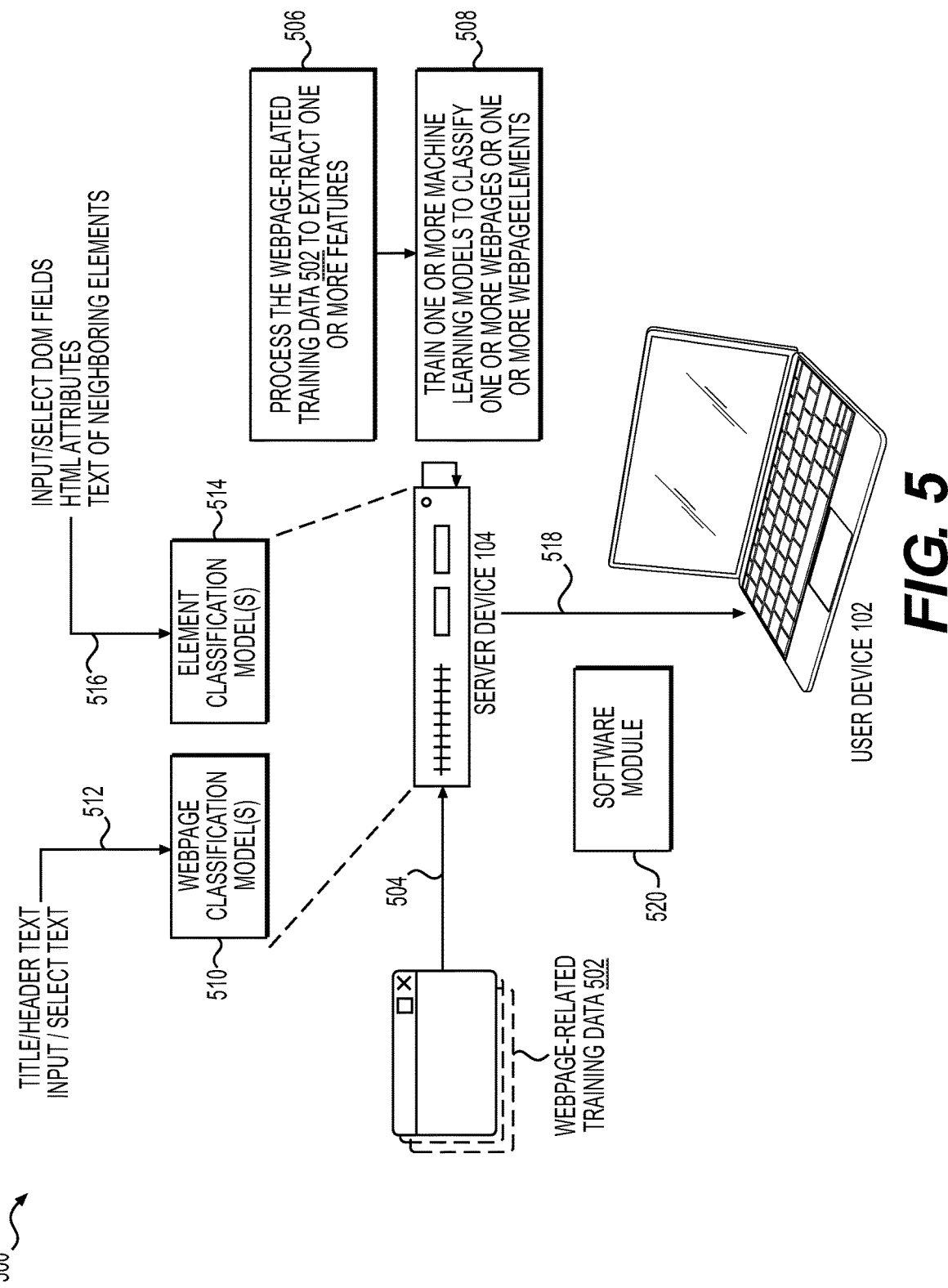
FIG. 5 depicts an example of training a machine-learning model to learn associations between one or more webpages and/or one or more webpage elements and classifications of the one or more webpages and/or the one or more webpage elements, according to certain embodiments.

FIG. 5 depicts an example 500 of training a machine-learning model to learn associations between webpages and/or webpage elements and classifications of the webpages and/or the webpage elements, according to certain embodiments. As depicted in FIG. 5, the example 500 includes the user device 102, the server device 104, and webpage-related training data 502. As depicted at 504, the server device 104 may receive the webpage-related training data 502. For example, the server device 104 may receive the webpage-related data in a manner similar to that described above in connection with the step 202 of the process 200. As a specific example, the server device 104 may receive the webpage-related training data 502 by accessing live webpages 404 of a certain classification, based on a user of the server device 104 inputting webpage-related training data 502 that has been designed to fit a certain classification, and/or the like. The webpage-related training data 502 may be similar to the data described above in connection with the process 200

At 506, the server device 104 may process the webpage-related training data 502, e.g., to extract one or more features of the webpage-related training data 502. For example, the server device 104 may process the webpage-related training data 502 in a manner similar that described above in connection with the step 204 of the process 200. As a specific example, the server device 104 may perform a pre-processing featurization of the webpage-related training data 502 and may then process the webpage-relate training data 502 using a tf-idf analysis or a logistic regression analysis.

At 508, the server device 104 may train one or more machine learning models to classify one or more webpages 404 or one or more webpage elements 408. For example, the server device 104 may train one or more machine learning models in a manner similar to that described above in connection with the step 206 of the process 200. The server device 104 may train one or more first machine learning models 510 to classify one or more webpages 404 (shown as "Webpage Classification Model(s)" in FIG. 5). For example, and as depicted at 512, the webpage-related training data 502 for the first machine learning models 510 may include title and/or header text for a webpage 404, input or select element 408 text displayed on the webpage 404, term frequency within the text of the webpage 404, and/or the like.

The server device 104 may train one or more second machine learning models 514 to classify one or more webpage elements 408 (shown as "Element Classification Model(s)" in FIG. 5). For example, and as depicted at 516, the webpage-related training data 502 for the second machine learning models 514 may include input or select element 408 DOM fields, HTML attributes, text of neighboring elements 408, and/or the like.

After training the machine learning models 510, 514, the server device 104 may provide a software module for installation on the user device 102, e.g., in a manner similar to that described above in connection with the step 208 of the process 200. For example, and as depicted at 518, the server device 104 may send, to the user device 102, a software module 520 for installation on the user device 102. The software module 520 may include an electronic application (e.g., a virtual assistant) to be installed on a web browser 402 of the user device 102 as a plugin or an extension of the web browser 402. Additionally, or alternatively, the software module 520 may include the machine learning models 510, 514 for use by the electronic application on the user device 102.

Accordingly, certain embodiments may train one or more machine learning models to classify webpages 404 and/or webpage elements 408 and may provide the machine learning modules, along with an electronic application, for installation on a user device 102. In this way, certain embodiments may facilitate classification of webpages and/or webpage elements at a user device 102 without needing to communicate with a server device 104. The example 500 described above is provided merely as an example, and may include additional, fewer, different, or differently arranged aspects than depicted in FIG. 5.

Figure 6:
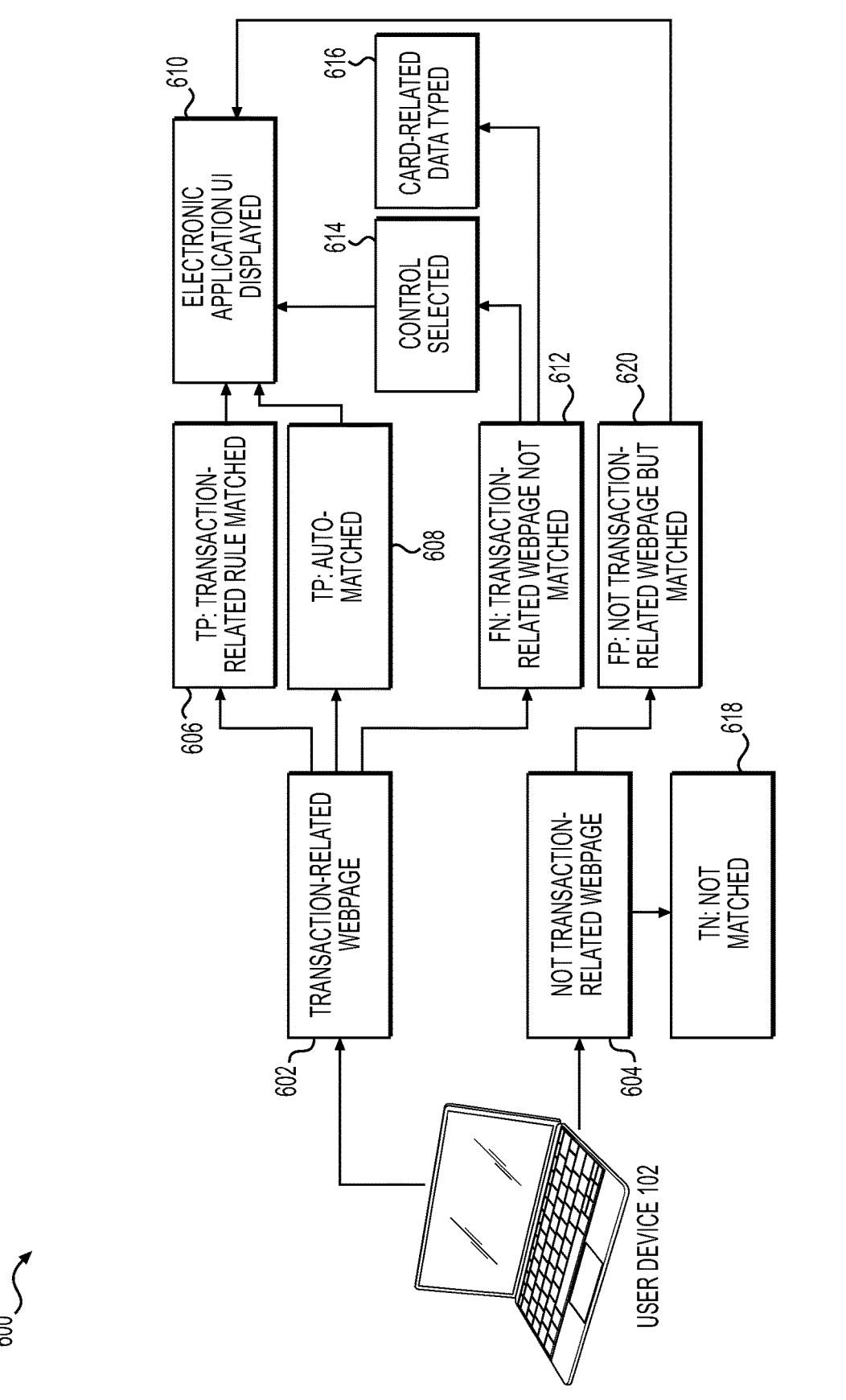
FIG. 6 depicts an example state diagram for displaying a user interface of an electronic application based on classifying one or more webpages and/or one or more webpage elements, according to certain embodiments.

FIG. 6 depicts an example state diagram 600 for displaying a user interface of an electronic application based on classifying one or more webpages and/or one or more webpage elements, according to certain embodiments. As depicted in FIG. 6, the example state diagram 600 includes a user device 102. As depicted at 602, a webpage 106 may be a transaction-related webpage 404 or, as depicted at 604, may not be a transaction-related webpage 404. For the transaction-related webpage 404 at 602, the user device 102 may, at 606, perform a true positive (TP) classification of the transaction-related webpage 404 based on matching a transaction-related rule (e.g., a particular webpage on a particular merchant website may be hard-coded in an electronic application as a transaction-related webpage). Alternatively, the user device 102 may, at 608, perform a true positive classification of the transaction-related webpage 404 based on automatically matching the transaction-related webpage 404 to a classification using the one or more machine learning models described elsewhere herein. Based on either a true positive classification at 606 or 608, an electronic application user interface (UI) may, at 610, be displayed on a web browser 402 (e.g., the web browser 402 may display a user interface 426). As described elsewhere herein, the user device 102 may populate data into webpage elements 408 based on a user's interaction with the user interface 426. The user device 102 may determine that a true positive classification has been performed based on the user interacting with the user interface 426 to cause data to be populated into webpage elements 408 of a webpage 404 and may then use information related to the webpage 404 and/or the webpage elements 408 to update the one or more machine learning models to improve an accuracy of the machine learning models.

Alternatively, the user device 102 may, at 612, perform a false negative (FN) classification of a transaction-related webpage 404 (e.g., may not classify a transaction-related webpage 404 as a transaction-related webpage). In this case, a user of the user device 102 may, at 614, select a control of an electronic application to cause, at 610, display of the electronic application UI and/or may, at 616, type transaction card-related data into webpage elements 408 of the webpage 404. The user device 102 may determine that a false negative classification has occurred based on the control selection at 614 and/or the typing of the transaction card-related data at 616 and may use information related to the webpage 404 and/or the webpage elements 408 to update the one or more machine learning models to improve an accuracy of the machine learning models.

If the webpage 404 is not a transaction-related webpage, as depicted at 604, the user device 102 may, at 618, perform a true negative (TN) classification of the webpage 404 (e.g., may accurately fail to classify the webpage 404 as a transaction-related webpage 404). In the case of a true negative classification of a webpage 404 that is not a transaction-related webpage, the user device 102 may not perform any additional action, may use information related to the webpage 404 and/or webpage elements 408 as training data for webpages 404 and/or webpage elements 408 that do not fit into a classification, and/or the like. As an alternative to the true negative classification at 618, the user device 102 may, at 620, perform a false positive (FP) classification of the webpage 404 (e.g., the user device 102 may incorrectly classify a non-transaction-related webpage 404 as a transaction-related webpage). In the case of a false positive classification of a webpage 404, the user device 102 may, at 610, display the electronic application UI. The user device 102 may then detect that the user has closed the electronic application UI without interacting with the electronic application UI to cause webpage elements 408 to be populated with data and may use information associated with the webpage 404 and/or the webpage elements 408 to update the machine learning models to not classify the webpage 404 or other similarly configured webpages 404 into a classification.

Accordingly, certain embodiments described herein may be configured to handle true positive, false positive, true negative, and false negative classifications of a webpage 404. This may conserve computing resources of the user device 102 that might otherwise be wasted, e.g., performing operations that are incorrect for the true classification of a webpage 404 (or a webpage element 408 of the webpage 404). The example 600 described above is provided merely as an example, and may include additional, fewer, different, or differently arranged aspects than depicted in FIG. 6.

Figure 7:
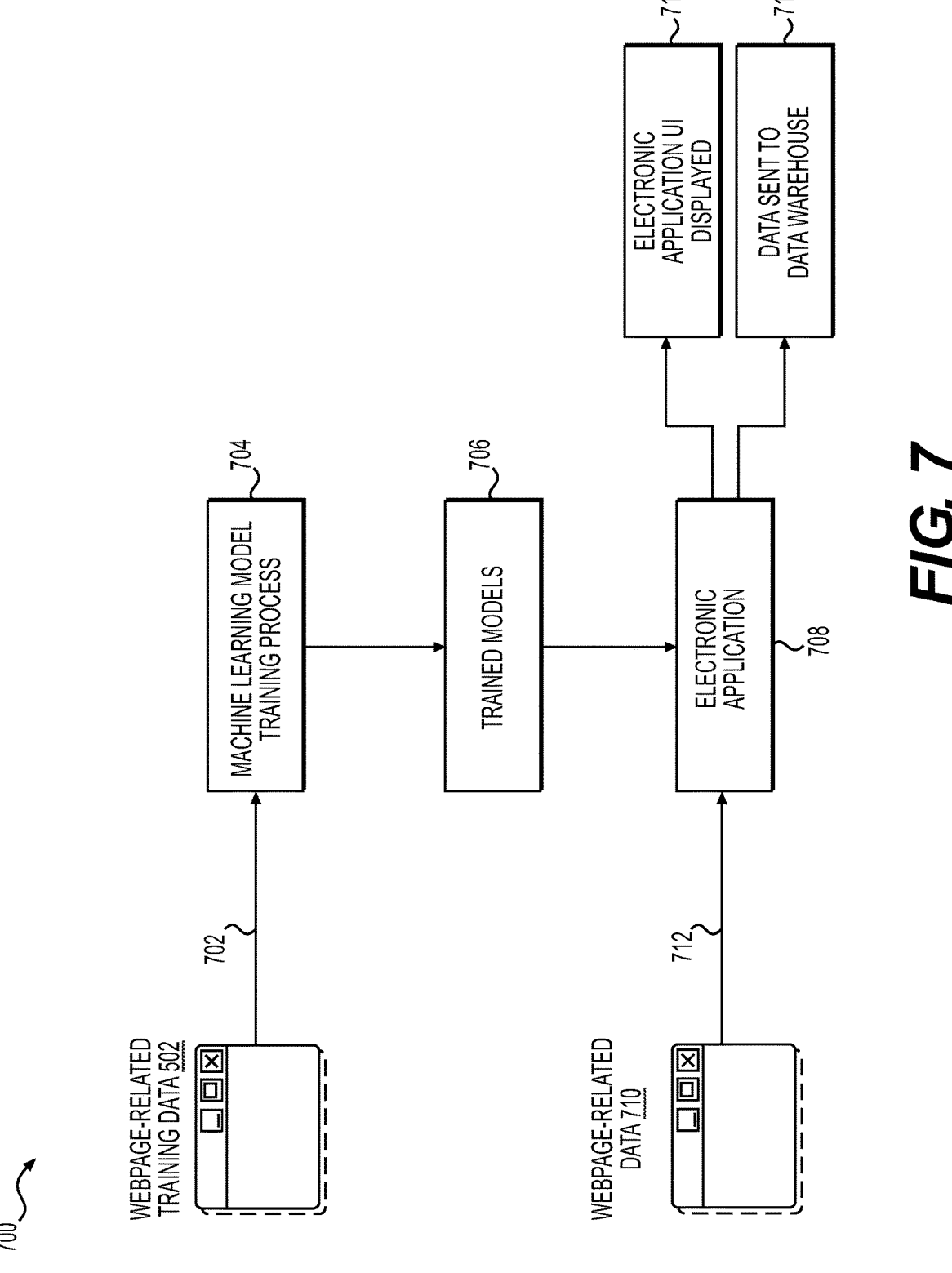
FIG. 7 depicts an example of training and using one or more machine learning models to classify one or more webpages and/or one or more webpage elements, according to certain embodiments.

FIG. 7 depicts an example 700 of training and using one or more machine learning models to classify one or more webpages and/or one or more webpage elements, according to certain embodiments. As depicted in FIG. 7, the example 700 includes the webpage-related training data 502. As depicted at 702, the webpage-related training data 502 may be input into a machine learning model training process 704. For example, the webpage-related training data 502 may be input to the machine learning model training process 704 in a manner similar to that described above in connection with the step 202 of the process 200. The machine learning training process 704 may be similar to the training described above in connection with the step 206 of the process 200 (e.g., after processing the webpage-related training data 502 in a manner similar to that described above in connection with the step 204 of the process 200).

The machine learning model training process 704 may output the trained models 706 to an electronic application 708. For example, the machine learning model training process 704 may output the trained machine learning models 706 in a manner similar to that described above in connection with the step 208 of the process 200. The trained machine learning models 706 may include webpage classification models 510 and/or element classification models 514. The electronic application 708 may receive, at 712, webpage-related data 710. For example, the webpage-related data 710 may be similar to the data described above in connection with the process 300.

The electronic application 708 may use the trained machine learning models 706 to process the webpage-related data 710 (e.g., in a manner similar to that described above in connection with the step 304 of the process 300). If the electronic application 708 classifies a webpage 404 into a classification (e.g., classifies the webpage 104 as a transaction-related webpage), then the electronic application 708 may, at 714, display a UI associated with the electronic application (e.g., may display the UI 426 in a manner similar to that described above in connection with the step 306 of the process 300). If the electronic application 708 determines that the classification was accurate (e.g., based on a user of a user device 102 interacting with the UI 426 to select certain controls), then the electronic application 708 may send the webpage-related data 710 to a data warehouse (e.g., hosted on one or more server devices 104) for use in training the one or more machine learning models 706 through another iteration of the machine learning training process 704.

Accordingly, certain embodiments may train and use one or more machine learning models to classify webpages and/or webpage elements based on webpage-related data 710. The example 700 described above is provided merely as an example, and may include additional, fewer, different, or differently arranged aspects than depicted in FIG. 7.

Figure 8:
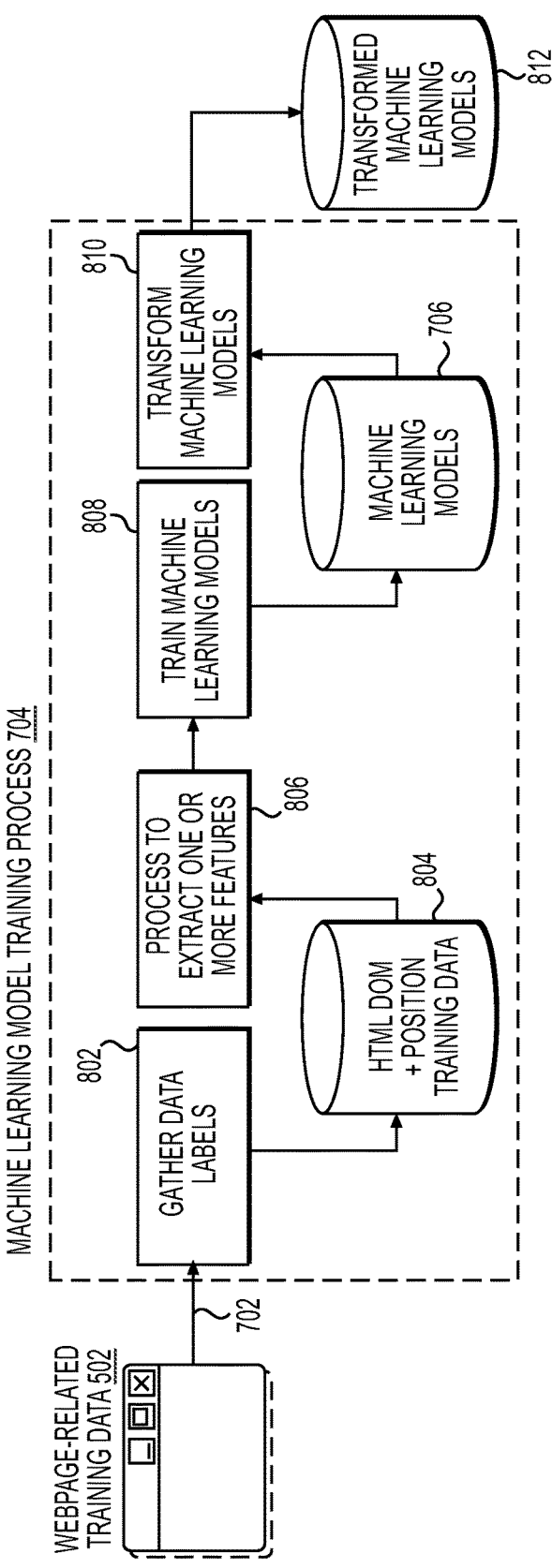
FIG. 8 depicts an example of training one or more machine learning models to classify one or more webpages and/or one or more webpage elements, according to certain embodiments.

FIG. 8 depicts an example 800 of training one or more machine learning models to classify one or more webpages or one or more webpage elements, according to certain embodiments. Specifically, FIG. 8 depicts example details of the machine learning model training process 704 of FIG. 7. The example 800 may include webpage-related training data 502 that is provided, at 702, to the machine learning model training process 704, as described above in connection with FIG. 7. The machine learning model training process 704 may include, at 802, extracting text, webpage elements 408, and/or the like from the webpage-related training data 502. For example, and as depicted at 804, the machine learning model training process 704 may form HTML DOM and position (e.g., pixel position) training data from the extracted text, webpage elements, and/or the like and may, at 806, process the training data 804 to extract one or more features (e.g., in a manner similar to that described at step 204 of the process 200 in FIG. 2).

As depicted at 808, the machine learning model training process 704 may include training machine learning models (e.g., as described elsewhere herein in connection with the step 206 of the process 200 in FIG. 2). The operations at 808 may output the machine learning models 706 described above in connection with FIG. 7. The machine learning model training process 704 may, at 810, transform the machine learning models 706 into transformed machine learning models 812. For example, the machine learning models 706 may be transformed from being programmed in a first programming language to being compatible with a second programming language, as described elsewhere herein. As depicted at 812, the machine learning model training process 704 may output the transformed machine learning models 812 (e.g., in a manner similar to that described above in connection with the step 208 of the process 200 of FIG. 2).

Accordingly, certain embodiments may train one or more machine learning models and may transform the one or more machine learning models from a first programming language to being compatible with a second programming language. This may facilitate optimization of model training and model installation by using one programming language to train the machine learning models (e.g., a programming language that is better suited for training machine learning models) and using another programming language to execute the machine learning models (e.g., a programming language compatible with the execution environment, such as a web browser 402). The example 800 described above is provided merely as an example, and may include additional, fewer, different, or differently arranged aspects than depicted in FIG. 8.

Figure 9:
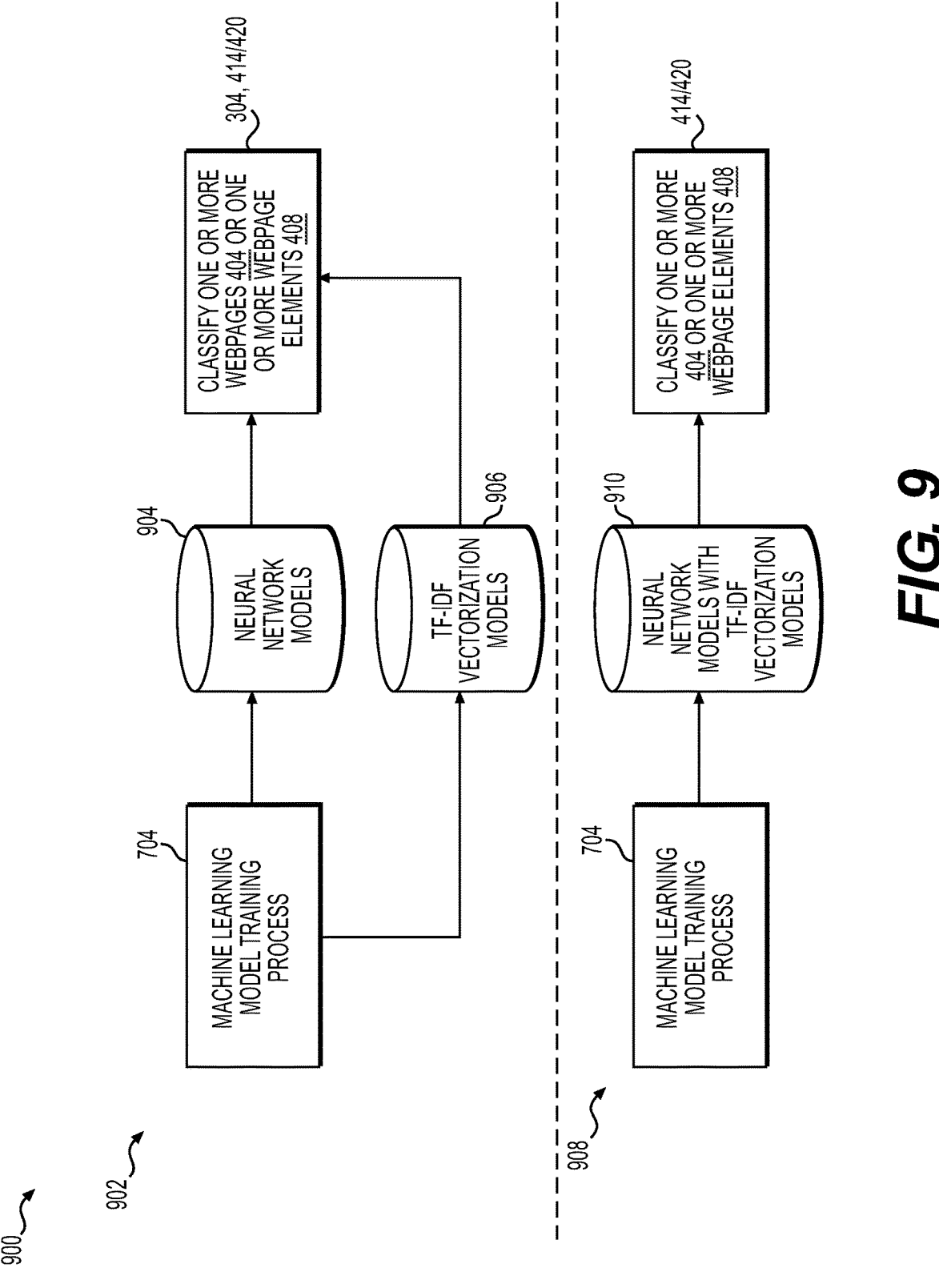
FIG. 9 depicts examples of machine learning model implementation, according to certain embodiments.

FIG. 9 depicts examples of machine learning model implementation, according to certain embodiments. FIG. 9 depicts a first example 902 of a machine learning model implementation. After the machine learning model training process 704 described in connection with FIG. 7, the trained machine learning models (e.g., machine learning models 706 of FIG. 7) may be separately stored as neural network models 904 and tf-idf vectorization models 906. Then the models 904, 906 may be used to classify one or more webpages 404 or one or more webpage elements 408 in a manner similar to that described for the step 304 of the process 300 and/or at 414/420 of FIG. 4B. This may facilitate using neural networks with one node class-by-class.

FIG. 9 further depicts a second example 908 of machine learning model implementation. After the machine learning model training process 704 described in connection with FIG. 7, the trained machine learning models (e.g., machine learning models 706 of FIG. 7) may be combined, at 910, by feeding tf-idf vectorization models to neural network models or including a layer in the neural network models for the tf-idf vectorization models. Then the models 910 may be used to determine a classification in a manner similar to that at the step 304 of the process 300 of FIG. 3 and/or at the steps 414/420 of FIG. 4B.

Accordingly, certain embodiments may use separate neural network models and tf-idf vectorization models or may use combined neural network models and tf-idf vectorization models. The example 900 described above is provided merely as an example, and may include additional, fewer, different, or differently arranged aspects than depicted in FIG. 9.

Figure 10:
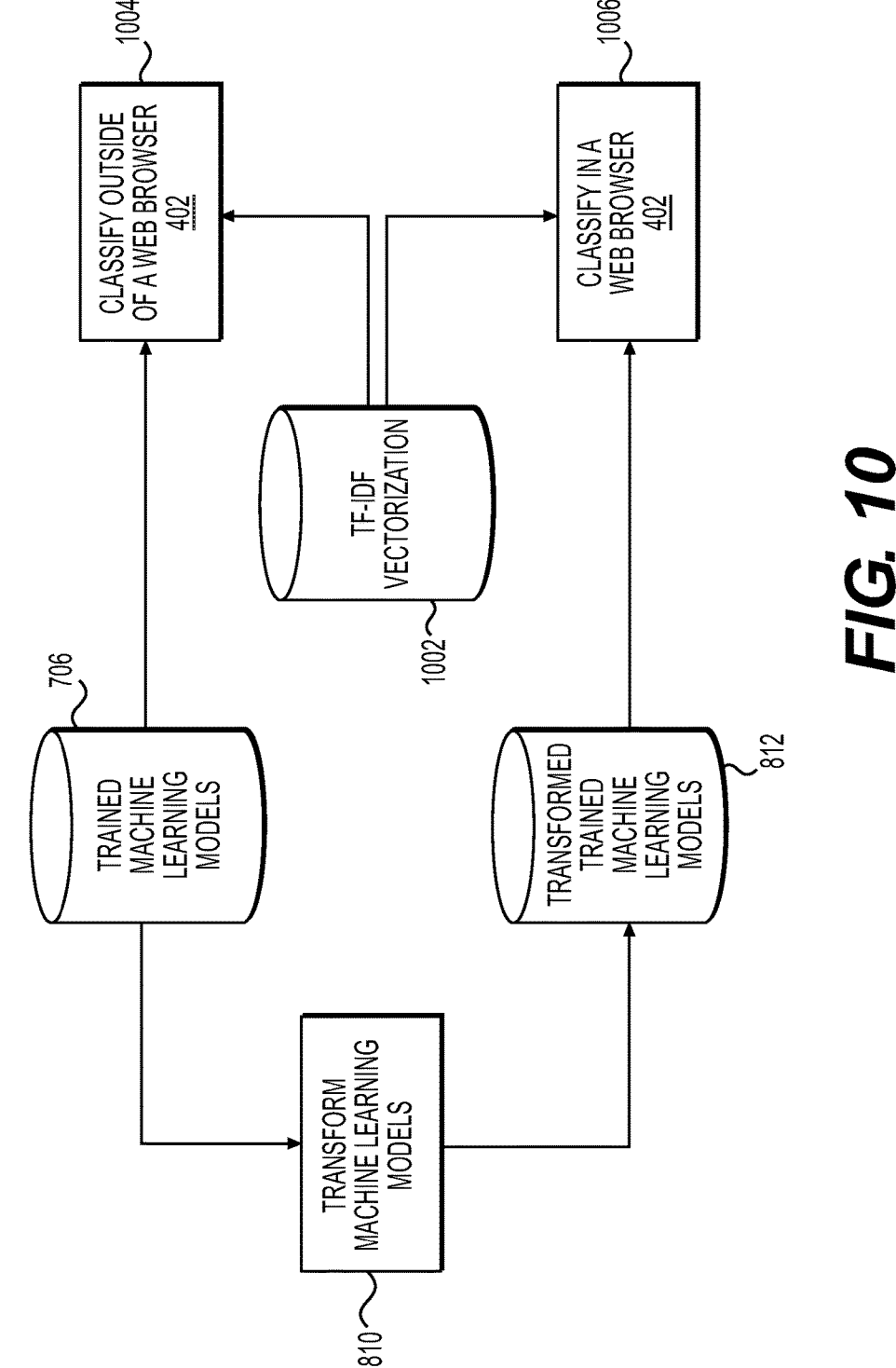
FIG. 10 depicts an example of transforming a machine learning model from a first programming language to a second programming language for use in a web browser, according to certain embodiments.

FIG. 10 depicts an example 1000 of transforming a model from a first programming language for training to a second programming language for use in a web browser 402, according to certain embodiments. As depicted in FIG. 10, trained machine learning models 706 of FIG. 7 may be input to the process 810 that transforms the machine learning models 706 to the transformed trained machine learning models 812. At 1004, the trained machine learning models 706 may be used to determine a classification outside of the web browser 402 (e.g., using tf-idf vectorization models 1002). At 1006, the transformed trained machine learning models 812 may be used to determine a classification in the web browser 402 (e.g., using tf-idf vectorization models 1002).

Accordingly, certain embodiments may classify one or more webpages and/or one or more webpage elements inside or outside of a web browser. The example 1000 described above is provided merely as an example, and may include additional, fewer, different, or differently arranged aspects than depicted in FIG. 10.

Figure 11:
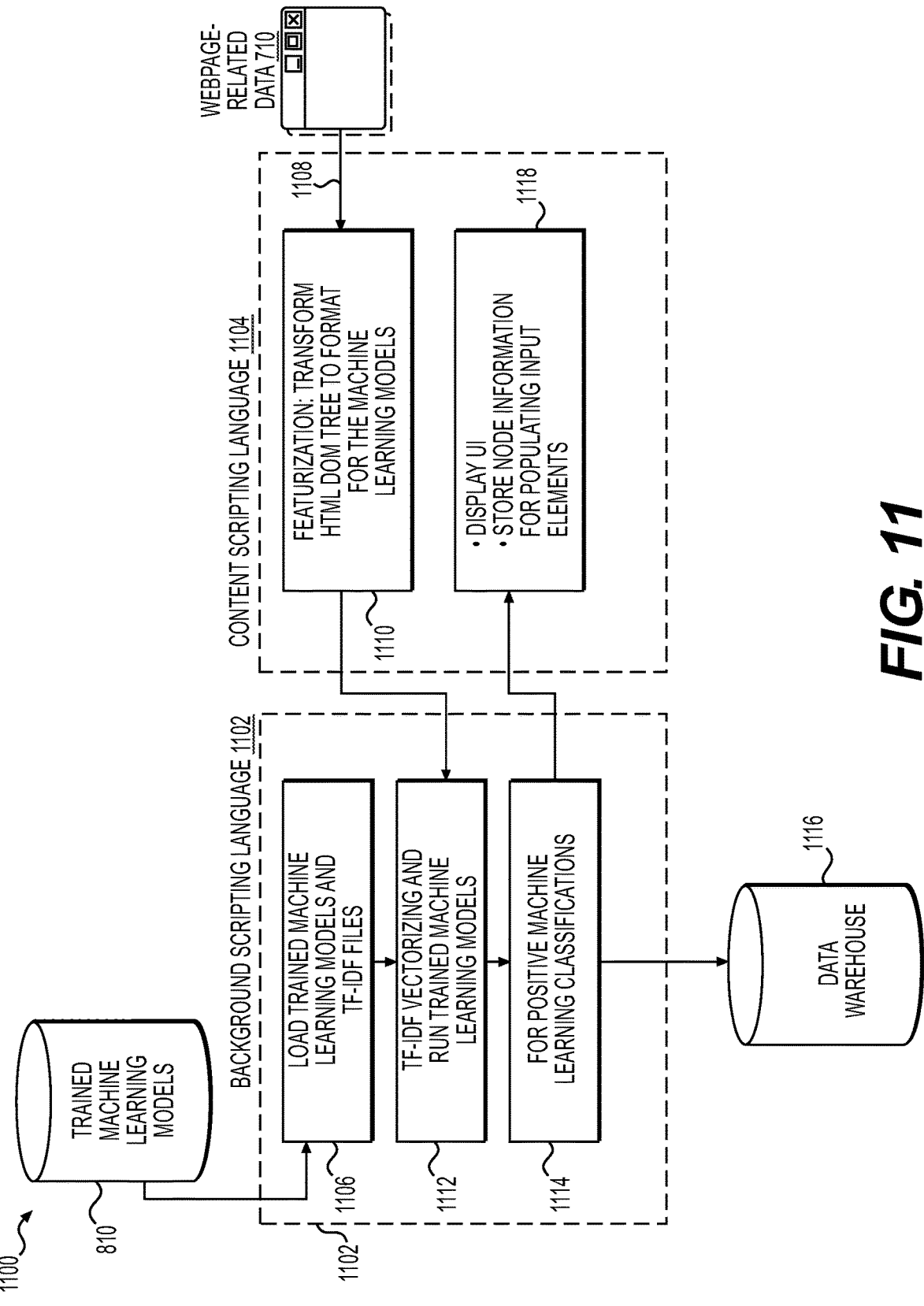
FIG. 11 depicts an example of a web browser executing one or more machine learning models, according to certain embodiments.

FIG. 11 depicts an example 1100 of a web browser 402 executing one or more machine learning models, according to certain embodiments. Portions of the execution may be performed using a background scripting language 1102 and other portions of the execution may be performed using a content scripting language 1104 executing on the web browser 402. A scripting language may include a programming language that automates performance of certain tasks. At 1106, the background scripting language 1102 may load the trained machine learning models 706 of FIG. 7 and tf-idf files. At 1108, webpage-related data 710 may be loaded by the content scripting language 1104. At 1110, the content scripting language 1104 may perform featurization to transform an HTML DOM tree to a format for the machine learning models 706. At 1112, the background scripting language 1102 may perform tf-idf vectorization and may run the trained machine learning models 706. These operations may use the transformed HTML DOM tree formed at 1110. At 1114, the background scripting language 1102 may send the webpage-related data 710 to a data warehouse 1116 for a positive machine learning classification. In addition, the content scripting language 1104 may, at 1118, display a UI 426 and/or store transaction card-related node information for populating input elements.

Accordingly, certain embodiments may utilize a background scripting language and a content scripting language to perform different portions of classifying one or more webpages and/or webpage elements. The example 1100 described above is provided merely as an example, and may include additional, fewer, different, or differently arranged aspects than depicted in FIG. 11.

In general, any process or operation discussed in this disclosure that is understood to be computer-implementable, such as the processes or operations depicted in FIGS. 2-11, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 12:
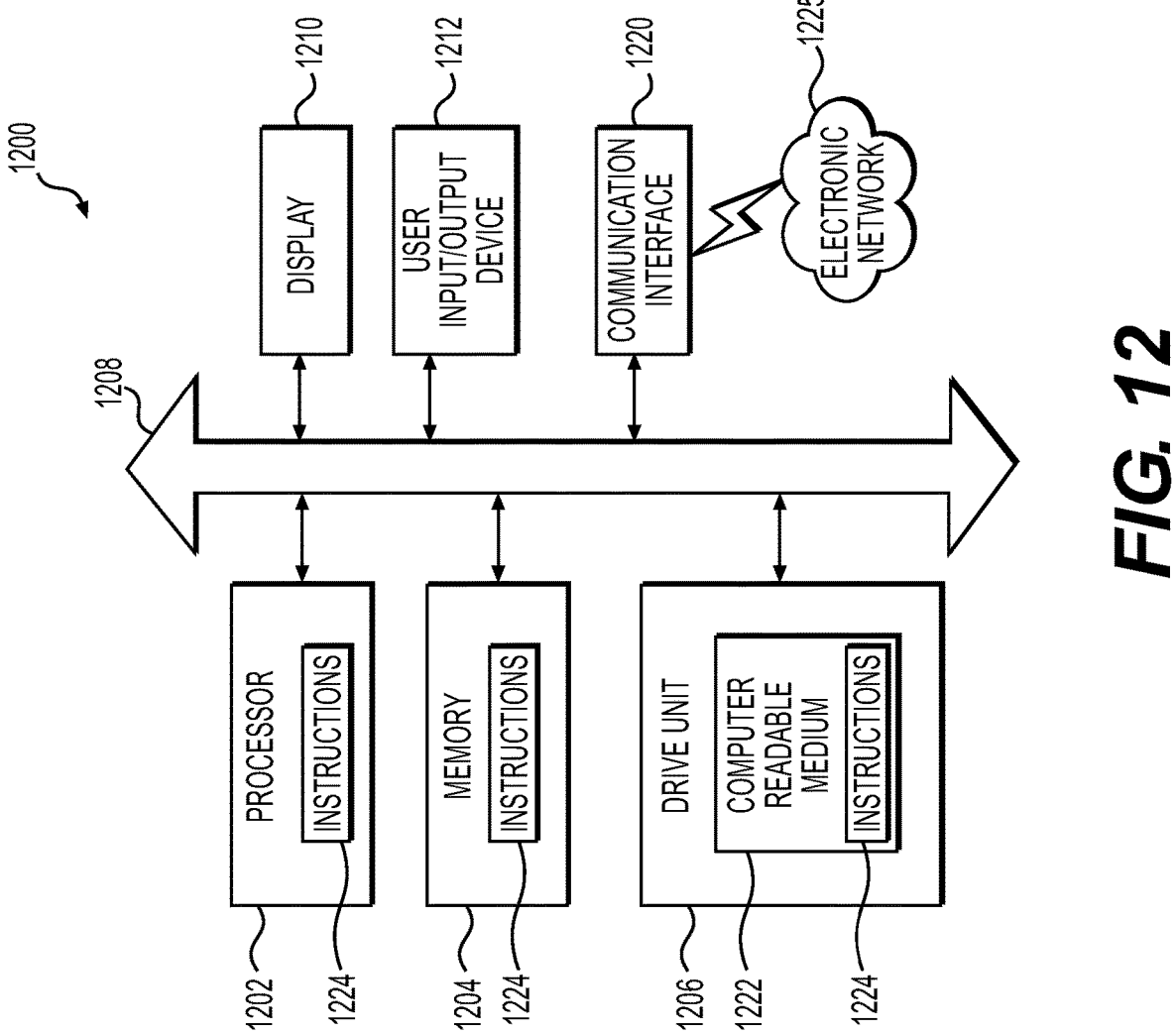
FIG. 12 depicts an example of a computer, according to certain embodiments.

FIG. 12 depicts an example of a computer 1200, according to certain embodiments. FIG. 12 is a simplified functional block diagram of a computer 1200 that may be configured as a device for executing processes or operations depicted in, or described with respect to, FIGS. 2-11, according to exemplary embodiments of the present disclosure. For example, the computer 1200 may be configured as the user device 102, server device 104, and/or another device according to exemplary embodiments of this disclosure. In various embodiments, any of the systems herein may be a computer 1200 including, e.g., a data communication interface 1220 for packet data communication. The computer 1200 may communicate with one or more other computers 1200 using the electronic network 1225. The network interfaces 114A, B in FIG. 1 may include one or more communication interfaces 1220. The electronic network 1225 may include a wired or wireless network similar to the network 106 depicted in FIG. 1.

The computer 1200 also may include a central processing unit ("CPU"), in the form of one or more processors 1202, for executing program instructions 1224. The processors 110A, B depicted in FIG. 1 may include one or more processors 1202 The computer 1200 may include an internal communication bus 1208, and a drive unit 1206 (such as read-only memory (ROM), hard disk drive (HDD), solid-state disk drive (SDD), etc.) that may store data on a computer readable medium 1222, although the computer 1200 may receive programming and data via network communications. The computer 1200 may also have a memory 1204 (such as random access memory (RAM)) storing instructions 1224 for executing techniques presented herein, although the instructions 1224 may be stored temporarily or permanently within other modules of computer 1200 (e.g., processor 1202 and/or computer readable medium 1222). The memories 110A, B depicted in FIG. 1 may include one or more memories 1204. The computer 1200 also may include user input and output ports 1212 and/or a display 1210 to connect with input and output devices such as keyboards, mice, touchscreens, monitors, displays, etc. The displays 108A, B may include one or more displays 1210. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more machine learning models to classify webpages or webpage elements, any suitable activity may be used. In an exemplary embodiment, instead of or in addition to training and/or using one or more machine learning models to classify webpages or webpage elements, the training and/or classifying includes populating webpage elements with data.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for classifying a webpage or one or more webpage elements, comprising:

detecting, by an electronic application operating on a user device, that a user of the user device has navigated to the webpage using a web browser also operating on the user device;

extracting, by the electronic application, first input data from the web browser, wherein the first input data includes at least:

a document object model (DOM) of the webpage, text associated with the webpage or the one or more webpage elements, and a position of the one or more webpage elements as rendered on a display associated with the user device;

classifying, by the electronic application, the webpage or the one or more webpage elements as either (i) transaction-related or (ii) not transaction-related, by inputting the first input data into one or more machine learning models of the electronic application that operate locally on the user device, wherein:

the one or more machine learning models have been trained based on one or more pre-classified webpages or webpage elements so as to learn associations between the one or more pre-classified webpages or webpage elements and one or more classifications, such that the one or more machine learning models are configured to perform the classifying based on the learned associations; and classifying the webpage is based on one or more fields included in the DOM, one or more attributes associated with the one or more fields, or a pixel position of the one or more webpage elements as rendered on the display;

in response to classifying the webpage or the one or more webpage elements as transaction-related, causing the user device to display a user interface associated with the electronic application, the user interface including information identifying the classifying;

generating, by the electronic application and based on the classification of the webpage or the one or more webpage elements, one or more metrics related to the classifying;

transmitting, by the electronic application, the one or more metrics to a server that is separate from the user device; and receiving, via the electronic application and from the server, one or more updated machine learning models that have been retrained based on the one or more metrics.

2. The computer-implemented method of claim 1, wherein the user interface further includes one or more input controls operable to cause the electronic application to populate transaction card-related data into at least one of the one or more webpage elements, and wherein the method further comprises:

based on selection of the one or more input controls, populating the transaction card-related data into the at least one of the one or more webpage elements.

3. The computer-implemented method of claim 1, wherein the one or more machine learning models comprise:

a first machine learning model trained to classify the webpage based on the text, and a second machine learning model trained to classify the one or more elements based on the DOM, the text, and the position.

4. The computer-implemented method of claim 1, further comprising:

performing a featurization of data associated with the webpage prior to classifying the webpage or the one or more webpage elements.

5. The computer-implemented method of claim 1, wherein the electronic application comprises an extension or a plugin installed on the web browser.

6. The computer-implemented method of claim 1, wherein the classifying of the webpage comprises:

classifying the webpage based on:

the text in a title or a header of the webpage, or the text in labels associated with input elements or selection elements of the webpage.

7. The computer-implemented method of claim 1, wherein the classifying of the one or more webpage elements comprises:

classifying the one or more webpage elements based on:

one or more fields included in the DOM, one or more attributes for the one or more fields in the DOM, or a relationship between the text and the one or more webpage elements based on a pixel position of the text and a pixel position of the one or more webpage elements.

8. The computer-implemented method of claim 1, wherein the classifying further comprises:

determining a first score for the webpage and a second score for the one or more webpage elements, wherein the first score and the second score indicate a fit of the webpage or the one or more webpage elements, respectively, to the classification; and classifying the webpage and the one or more webpage elements based on the first score and the second score.

9. The computer-implemented method of claim 1, wherein the classifying further comprises:

determining that the webpage is transaction-related based on the text in a title or a header of the webpage, text associated with input webpage elements or selection webpage elements of the one or more webpage elements, and particular terms included in the text.

10. A computer-implemented method for training a machine-learning model for classifying one or more webpages or webpage elements, comprising:

receiving data associated with one or more webpages or one or more webpage elements, wherein the one or more webpages or the one or more webpage elements are labelled with a classification of either (i) transaction-related or (ii) not transaction-related, wherein the data comprises document object models (DOMs) of the one or more webpages, one or more fields included in the DOMs, one or more attributes associated with the one or more fields, text associated with the one or more webpages or the one or more webpage elements, and pixel positions of the one or more webpage elements as rendered on a display associated with a user device;

processing the data to extract one or more features from the data;

training one or more machine learning models to classify one or more other webpages or one or more other webpage elements based on the extracted features;

providing a software module for installation on one or more user devices, wherein the software module comprises the one or more trained machine learning models and an electronic application configured to use the one or more machine learning models;

receiving, from the one or more user devices, one or more metrics generated by the electronic application of each user device of the one or more user devices, the one or more metrics related to classifying of webpages as either (i) transaction related or (ii) not transaction related;

retraining the one or more machine learning models based on the one or more metrics from the one or more user devices; and providing an updated software module for installation on the one or more user devices, wherein the updated software module comprises the one or more retrained machine learning models.

11. The computer-implemented method of claim 10, wherein the training of the one or more machine learning models further comprises:

training the one or more machine learning models using a first programming language; and wherein the method further comprises:

transforming the one or more machine learning models from the first programming language to a second programming language.

12. The computer-implemented method of claim 10, wherein the processing of the data to extract the one or more features further comprises:

processing the data using at least a term frequency-inverse document frequency analysis and a logistic regression analysis.

13. The computer-implemented method of claim 10, wherein the training of the one or more machine learning models further comprises:

determining a first score that indicates an accuracy of the classification of the one or more webpages; and determining a second score that indicates an accuracy of the classification of the one or more webpage elements.

14. The computer-implemented method of claim 13, further comprising:

performing a model weights analysis based on the first score and the second score.

15. The computer-implemented method of claim 10, wherein the providing of the software module further comprises:

providing the software module to a server device for installation by the user device, or installing the software module in a web browser on the user device as an extension or a plugin.

16. The computer-implemented method of claim 10, wherein the one or more machine learning models each comprise one or more neural networks with a single node.

17. A system for classifying a webpage or one or more webpage elements, comprising:

a server device configured to receive one or more metrics and retrain one or more machine learning models based on the received one or more metrics; and a user device that includes:

a memory storing:

instructions; and an electronic application that includes one or more machine learning models trained, based on webpages and associated webpage elements, to learn associations between the webpages and associated webpage elements and output classifications based on the learned associations in response to input webpage-related data, wherein the one or more machine learning models operate locally on the user device; and a processor operatively connected to the memory and configured to execute the instructions to perform operations including:

receiving, by the electronic application, an indication to start monitoring web browsing activity of a user of the user device;

detecting, by the electronic application, that the user has navigated to the webpage using a web browser installed on the user device;

extracting, by the electronic application, first input data from the web browser, wherein the first input data includes at least:

a document object model (DOM) of the webpage, one or more fields included in the DOM, one or more attributes associated with the one or more fields, text associated with the webpage or the one or more webpage elements, and a pixel position of the one or more webpage elements as rendered on a display associated with the user device;

classifying, by the electronic application, the webpage or the one or more webpage elements as either (i) transaction-related or (ii) not transaction related, by inputting the first input data into the one or more machine learning models, in response to classifying the webpage or the one or more webpage elements as transaction-related, causing the user device to display a user interface associated with the electronic application, the user interface including:

information identifying the classifying, and one or more input controls associated with causing the electronic application to populate transaction-related data into at least one of the one or more webpage elements;

based on selection of the one or more input controls, populating, by the user device, the transaction-related data into the at least one of the one or more elements;

generating, by the electronic application and based on the selection of the one or more input controls, one or more metrics related to the classifying;

transmitting, by the electronic application, the one or more metrics to the server; and receiving, via the electronic application and from the server, one or more updated machine learning models that have been retrained based on the one or more metrics.

18. The computer-implemented method of claim 1, wherein the one or more updated machine learning models have been retrained based on one or more metrics from a plurality of different user devices.

19. The computer-implemented method of claim 10, wherein the retraining of the one or more machine learning models is based on one or more metrics from a plurality of user devices.

* * * * *